United States Patent
Nakamura et al.

(10) Patent No.: US 10,358,558 B2
(45) Date of Patent: *Jul. 23, 2019

(54) WATER-ABSORBENT RESIN COMPOSITION, METHOD OF MANUFACTURING THE SAME, AND ABSORBENT ARTICLE

(71) Applicant: NIPPON SHOKUBAI CO., LTD., Osaka-shi, Osaka (JP)

(72) Inventors: Masatoshi Nakamura, Hyogo (JP); Koji Miyake, Okayama (JP); Taku Iwamura, Hyogo (JP); Yusuke Watanabe, Hyogo (JP)

(73) Assignee: NIPPON SHOKUBAI CO., LTD., Osaka-Shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/892,635

(22) Filed: Feb. 9, 2018

(65) Prior Publication Data

US 2018/0201788 A1 Jul. 19, 2018

Related U.S. Application Data

(63) Continuation of application No. 12/083,238, filed as application No. PCT/JP2006/325691 on Dec. 19, 2006, now Pat. No. 9,926,449.

(30) Foreign Application Priority Data

Dec. 22, 2005 (JP) ................................. 2005-370859

(51) Int. Cl.
 *C08L 101/14* (2006.01)
 *C08L 33/02* (2006.01)

(52) U.S. Cl.
 CPC ............ *C08L 101/14* (2013.01); *C08L 33/02* (2013.01); *C08L 2312/00* (2013.01)

(58) Field of Classification Search
 CPC ..... C08L 101/14; C08L 33/02; C08L 2312/00
 USPC ........................................................ 524/437
 See application file for complete search history.

(56) References Cited

U.S. PATENT DOCUMENTS

| | | | |
|---|---|---|---|
| 625,488 A | 5/1899 | Auspitz |
| 632,352 A | 9/1899 | Jones |
| 670,141 A | 3/1901 | Shepard |
| 922,717 A | 5/1909 | Parker |
| 955,086 A | 4/1910 | Laux |
| 3,259,374 A | 7/1966 | Doebl et al. |
| 3,346,242 A | 10/1967 | List |
| 3,935,099 A | 1/1976 | Weaver et al. |
| 3,959,569 A | 5/1976 | Burkholder, Jr. |
| 4,043,952 A | 8/1977 | Ganslaw et al. |
| 4,076,663 A | 2/1978 | Masuda et al. |
| 4,090,013 A | 5/1978 | Ganslaw et al. |
| 4,093,776 A | 6/1978 | Aoki et al. |
| 4,124,748 A | 11/1978 | Fujimoto et al. |
| 4,190,563 A | 2/1980 | Bosley et al. |
| 4,224,427 A | 9/1980 | Mueller et al. |
| 4,286,082 A | 8/1981 | Tsubakimoto et al. |
| 4,320,040 A | 3/1982 | Fujita et al. |
| 4,351,922 A | 9/1982 | Yoshida et al. |
| 4,367,323 A | 1/1983 | Kitamura et al. |
| 4,389,513 A | 6/1983 | Miyazaki |
| 4,416,711 A | 11/1983 | Jessop et al. |
| 4,446,261 A | 5/1984 | Yamasaki et al. |
| 4,455,284 A | 6/1984 | Sizyakov et al. |
| 4,497,930 A | 2/1985 | Yamasaki et al. |
| 4,526,937 A | 7/1985 | Hsu |
| 4,558,091 A | 12/1985 | Hubbard |
| 4,587,308 A | 5/1986 | Makita et al. |
| 4,625,001 A | 11/1986 | Tsubakimoto et al. |
| 4,652,001 A | 3/1987 | Rathbun et al. |
| 4,654,039 A | 3/1987 | Brandt et al. |
| 4,666,983 A | 5/1987 | Tsubakimoto et al. |
| 4,683,274 A | 7/1987 | Nakamura et al. |
| 4,690,996 A | 9/1987 | Shih et al. |

(Continued)

FOREIGN PATENT DOCUMENTS

| CA | 2 433 044 A1 | 7/2002 |
|---|---|---|
| CA | 2 403 966 A1 | 9/2002 |

(Continued)

OTHER PUBLICATIONS

US 6,863,978 B2, 03/2005, Inger et al. (withdrawn)
"Chemicals Used for Treatment of Water", European Standard, EN 878, European Committee for Standardization, Jun. 2004.
"Solubility Parameter Values", The Polymer Handbook 3rd Edition, published by Wiley Interscience Publication, pp. 524, 525, 527-539.
A1: *Characterization Analysis* of the patent claims of EP 1 512 712 B1, Apr. 27, 2011.
A6: *The step (B) and the step (D) are performed within 10 minutes in total*, Möglichkeiten zu Merkmal.
Abstract of JP 06-211934 published on Aug. 2, 1994.

(Continued)

*Primary Examiner* — Michael Bernshteyn
(74) *Attorney, Agent, or Firm* — Harness Dickey & Pierce P.L.C.

(57) ABSTRACT

A water-absorbent resin composition is provided which shows only small reduction in liquid permeability and limited coloring over time or in relation to another factor. The water-absorbent resin composition (particulate absorbent agent) of the present invention contains: a polycarboxylate-based water-absorbent resin as a primary component, the resin having a crosslinked structure formed by polymerization of an acid group-containing unsaturated monomer; and multivalent metal cations (preferably, on surfaces of particles (i.e., the water-absorbent resin composition)) wherein: the multivalent metal cations other than Fe cations account for 0.001 to 1 mass % of the water-absorbent resin; and the ratio of the Fe cations to the multivalent metal cations other than the Fe cations is less than or equal to 5.00 mass %.

14 Claims, 1 Drawing Sheet

(56) References Cited

U.S. PATENT DOCUMENTS

| | | |
|---|---|---|
| 4,693,713 A | 9/1987 | Chmelir et al. |
| 4,721,647 A | 1/1988 | Nakanishi et al. |
| 4,734,478 A | 3/1988 | Tsubakimoto et al. |
| RE32,649 E | 4/1988 | Brandt et al. |
| 4,738,867 A | 4/1988 | Itoh et al. |
| 4,748,076 A | 5/1988 | Saotome |
| 4,755,562 A | 7/1988 | Alexander et al. |
| 4,769,427 A | 9/1988 | Nowakowsky et al. |
| 4,771,105 A | 9/1988 | Shirai et al. |
| 4,783,510 A | 11/1988 | Saotome |
| 4,824,901 A | 4/1989 | Alexander et al. |
| 4,826,917 A | 5/1989 | Kondo et al. |
| 4,863,989 A | 9/1989 | Obayashi et al. |
| 4,873,299 A | 10/1989 | Nowakowsky et al. |
| 4,880,455 A | 11/1989 | Blank |
| 4,948,818 A | 8/1990 | Carmody et al. |
| 4,950,692 A | 8/1990 | Lewis et al. |
| 4,972,019 A | 11/1990 | Obayashi et al. |
| 4,973,632 A | 11/1990 | Nagasuna et al. |
| 4,985,514 A | 1/1991 | Kimura et al. |
| 4,985,518 A | 1/1991 | Alexander et al. |
| 5,002,986 A | 3/1991 | Fujiura et al. |
| 5,026,800 A | 6/1991 | Kimura et al. |
| 5,030,205 A | 7/1991 | Holdaway et al. |
| 5,051,259 A | 9/1991 | Olsen et al. |
| 5,061,259 A | 10/1991 | Goldman et al. |
| RE33,839 E | 3/1992 | Chmelir et al. |
| 5,124,416 A | 6/1992 | Haruna et al. |
| 5,140,076 A | 8/1992 | Hatsuda et al. |
| 5,145,906 A | 9/1992 | Chambers et al. |
| 5,147,343 A | 9/1992 | Kellenberger |
| 5,149,335 A | 9/1992 | Kellenberger et al. |
| 5,154,713 A | 10/1992 | Lind |
| 5,164,459 A | 11/1992 | Kimura et al. |
| 5,180,798 A | 1/1993 | Nakamura et al. |
| 5,185,413 A | 2/1993 | Yoshinaga et al. |
| 5,229,488 A | 7/1993 | Nagasuna et al. |
| 5,244,735 A | 9/1993 | Kimura et al. |
| 5,250,640 A | 10/1993 | Irie et al. |
| 5,264,495 A | 11/1993 | Irie et al. |
| 5,275,773 A | 1/1994 | Irie et al. |
| 5,288,814 A | 2/1994 | Long, II et al. |
| 5,296,650 A | 3/1994 | Kobayashi et al. |
| 5,300,192 A | 4/1994 | Hansen et al. |
| 5,308,896 A | 5/1994 | Hansen et al. |
| 5,314,420 A | 5/1994 | Smith et al. |
| 5,322,896 A | 6/1994 | Ueda et al. |
| 5,328,935 A | 7/1994 | Van Phan et al. |
| 5,338,766 A | 8/1994 | Phan et al. |
| 5,369,148 A | 11/1994 | Takahashi et al. |
| 5,371,148 A | 12/1994 | Taylor et al. |
| 5,380,808 A | 1/1995 | Sumiya et al. |
| 5,385,983 A | 1/1995 | Graham |
| 5,409,771 A | 4/1995 | Dahmen et al. |
| 5,419,956 A | 5/1995 | Roe |
| 5,422,405 A | 6/1995 | Dairoku et al. |
| 5,439,993 A | 8/1995 | Ito et al. |
| 5,447,727 A | 9/1995 | Graham |
| 5,447,977 A | 9/1995 | Hansen et al. |
| 5,453,323 A | 9/1995 | Chambers et al. |
| 5,455,284 A | 10/1995 | Dahmen et al. |
| 5,462,972 A | 10/1995 | Smith et al. |
| 5,475,062 A | 12/1995 | Ishizaki et al. |
| 5,478,879 A | 12/1995 | Kajikawa et al. |
| 5,506,324 A | 4/1996 | Gartner et al. |
| 5,532,323 A | 7/1996 | Yano et al. |
| 5,538,783 A | 7/1996 | Hansen et al. |
| 5,543,215 A | 8/1996 | Hansen et al. |
| 5,543,433 A | 8/1996 | Doetzer et al. |
| 5,562,646 A | 10/1996 | Goldman et al. |
| 5,571,618 A | 11/1996 | Hansen et al. |
| 5,574,121 A | 11/1996 | Irie et al. |
| 5,589,256 A | 12/1996 | Hansen et al. |
| 5,597,873 A | 1/1997 | Chambers et al. |
| 5,599,335 A | 2/1997 | Goldman et al. |
| 5,601,452 A | 2/1997 | Ruffa |
| 5,601,542 A | 2/1997 | Melius et al. |
| 5,609,727 A | 3/1997 | Hansen et al. |
| 5,610,208 A | 3/1997 | Dairoku et al. |
| 5,610,220 A | 3/1997 | Klimmek et al. |
| 5,614,570 A | 3/1997 | Hansen et al. |
| 5,624,967 A | 4/1997 | Hitomi et al. |
| 5,633,316 A | 5/1997 | Gartner et al. |
| 5,656,087 A | 8/1997 | Kikuchi et al. |
| 5,668,078 A | 9/1997 | Sumiya et al. |
| 5,669,894 A | 9/1997 | Goldman et al. |
| 5,672,633 A | 9/1997 | Brehm et al. |
| 5,684,072 A | 11/1997 | Rardon et al. |
| 5,712,316 A | 1/1998 | Dahmen et al. |
| 5,728,742 A | 3/1998 | Staples et al. |
| 5,744,564 A | 4/1998 | Stanley, Jr. et al. |
| 5,760,080 A | 6/1998 | Wada et al. |
| 5,795,893 A | 8/1998 | Bondinell et al. |
| 5,797,893 A | 8/1998 | Wada et al. |
| 5,801,238 A | 9/1998 | Tanaka et al. |
| 5,837,789 A | 11/1998 | Stockhausen et al. |
| 5,843,575 A | 12/1998 | Wang et al. |
| 5,849,405 A | 12/1998 | Wang et al. |
| 5,851,672 A | 12/1998 | Wang et al. |
| 5,853,867 A | 12/1998 | Harada et al. |
| 5,858,535 A | 1/1999 | Wang et al. |
| 5,861,429 A | 1/1999 | Sato et al. |
| 5,883,158 A | 3/1999 | Nambu et al. |
| 5,973,042 A | 10/1999 | Yoshinaga et al. |
| 5,981,070 A | 11/1999 | Ishizaki et al. |
| 5,985,944 A | 11/1999 | Ishizaki et al. |
| 5,987,070 A | 11/1999 | Fimoff et al. |
| 5,994,440 A | 11/1999 | Staples et al. |
| 6,037,431 A | 3/2000 | Shioji et al. |
| 6,054,541 A | 4/2000 | Wada et al. |
| 6,071,976 A | 6/2000 | Dairoku et al. |
| 6,076,277 A | 6/2000 | Eyerer et al. |
| 6,087,002 A | 7/2000 | Kimura et al. |
| 6,087,450 A | 7/2000 | Breitbach et al. |
| 6,099,950 A | 8/2000 | Wang et al. |
| 6,100,305 A | 8/2000 | Miyake et al. |
| 6,107,358 A | 8/2000 | Harada et al. |
| 6,110,992 A | 8/2000 | Wada et al. |
| 6,124,391 A | 9/2000 | Sun et al. |
| 6,127,454 A | 10/2000 | Wada et al. |
| 6,133,193 A | 10/2000 | Kajikawa et al. |
| 6,136,973 A | 10/2000 | Suzuki et al. |
| 6,140,395 A | 10/2000 | Hatsuda et al. |
| 6,143,821 A | 11/2000 | Houben |
| 6,150,582 A | 11/2000 | Wada et al. |
| RE37,021 E | 1/2001 | Aida |
| 6,174,929 B1 | 1/2001 | Hahnle et al. |
| 6,174,978 B1 | 1/2001 | Hatsuda et al. |
| 6,180,724 B1 | 1/2001 | Wada et al. |
| 6,184,433 B1 | 2/2001 | Harada et al. |
| 6,194,531 B1 | 2/2001 | Hatsuda et al. |
| 6,199,992 B1 | 3/2001 | Tanada |
| 6,207,772 B1 | 3/2001 | Hatsuda et al. |
| 6,228,930 B1 | 5/2001 | Dairoku et al. |
| 6,232,520 B1 | 5/2001 | Hird et al. |
| 6,239,230 B1 | 5/2001 | Eckert et al. |
| 6,241,928 B1 | 6/2001 | Hatsuda et al. |
| 6,251,950 B1 | 6/2001 | Durden et al. |
| 6,251,960 B1 | 6/2001 | Ishizaki et al. |
| 6,254,990 B1 | 7/2001 | Ishizaki et al. |
| 6,284,362 B1 | 9/2001 | Takai et al. |
| 6,297,319 B1 | 10/2001 | Nagasuna et al. |
| 6,297,335 B1 | 10/2001 | Funk et al. |
| 6,300,275 B1 | 10/2001 | Weir |
| 6,300,423 B1 | 10/2001 | Engelhardt et al. |
| 6,310,156 B1 | 10/2001 | Maeda et al. |
| 6,313,231 B1 | 11/2001 | Hosokawa et al. |
| 6,323,252 B1 | 11/2001 | Gartner et al. |
| 6,335,406 B1 | 1/2002 | Nagasuna et al. |
| 6,360,077 B2 | 3/2002 | Mizoguchi |
| 6,372,852 B2 | 4/2002 | Hitomi et al. |
| 6,376,618 B1 | 4/2002 | Mitchell et al. |
| 6,388,000 B1 | 5/2002 | Irie et al. |
| 6,403,700 B1 | 6/2002 | Dahmen et al. |

(56) References Cited

U.S. PATENT DOCUMENTS

| | | |
|---|---|---|
| 6,414,214 B1 | 7/2002 | Engelhardt et al. |
| 6,417,425 B1 | 7/2002 | Whitmore et al. |
| 6,433,058 B1 | 8/2002 | Weir et al. |
| 6,444,744 B1 | 9/2002 | Fujimaru et al. |
| 6,448,320 B1 | 9/2002 | Igarashi et al. |
| 6,455,600 B1 | 9/2002 | Hahnle et al. |
| 6,458,921 B1 | 10/2002 | Dairoku et al. |
| 6,469,080 B2 | 10/2002 | Miyake et al. |
| 6,472,478 B1 | 10/2002 | Funk et al. |
| 6,514,615 B1 | 2/2003 | Sun et al. |
| 6,559,239 B1 | 5/2003 | Riegel et al. |
| 6,562,743 B1 | 5/2003 | Cook et al. |
| 6,562,879 B1 | 5/2003 | Hatsuda et al. |
| 6,565,768 B1 | 5/2003 | Dentler et al. |
| 6,579,958 B2 | 6/2003 | Wilson |
| 6,586,549 B1 | 7/2003 | Hatsuda et al. |
| 6,599,989 B2 | 7/2003 | Wada et al. |
| 6,605,673 B1 | 8/2003 | Mertens et al. |
| 6,620,889 B1 | 9/2003 | Mertens et al. |
| 6,620,899 B1 | 9/2003 | Morken et al. |
| 6,657,015 B1 | 12/2003 | Riegel et al. |
| 6,667,372 B1 | 12/2003 | Miyake et al. |
| RE38,444 E | 2/2004 | Wada et al. |
| 6,716,894 B2 | 4/2004 | Kajikawa et al. |
| 6,716,929 B2 | 4/2004 | Wilson |
| 6,720,073 B2 | 4/2004 | Lange et al. |
| 6,727,345 B2 | 4/2004 | Kajikawa et al. |
| 6,730,387 B2 | 5/2004 | Rezai et al. |
| 6,743,391 B2 | 6/2004 | Sun et al. |
| 6,787,001 B2 | 9/2004 | Sakamoto et al. |
| 6,809,158 B2 | 10/2004 | Ikeuchi et al. |
| 6,831,142 B2 | 12/2004 | Mertens et al. |
| 6,835,325 B1 | 12/2004 | Nakamura et al. |
| 6,841,229 B2 | 1/2005 | Sun et al. |
| 6,849,665 B2 | 2/2005 | Frenz et al. |
| 6,927,268 B2 | 8/2005 | Matsumoto et al. |
| 6,930,221 B1 | 8/2005 | Strandqvist |
| 6,951,895 B1 | 10/2005 | Qin et al. |
| 6,992,144 B2 | 1/2006 | Dairoku et al. |
| 7,049,366 B2 | 5/2006 | Nakahara et al. |
| 7,157,141 B2 | 1/2007 | Inger et al. |
| 7,169,843 B2 | 1/2007 | Smith et al. |
| 7,173,086 B2 | 2/2007 | Smith et al. |
| 7,179,875 B2 | 2/2007 | Fuchs et al. |
| 7,282,262 B2 | 10/2007 | Adachi et al. |
| 7,285,599 B2 | 10/2007 | Mertens et al. |
| 7,307,132 B2 | 12/2007 | Nestler et al. |
| 7,378,453 B2 | 5/2008 | Nogi et al. |
| 7,435,477 B2 | 10/2008 | Adachi et al. |
| 7,473,739 B2 | 1/2009 | Dairoku et al. |
| 7,510,988 B2 | 3/2009 | Wada et al. |
| 7,557,245 B2 | 7/2009 | Nordhoff et al. |
| 7,572,864 B2 | 8/2009 | Mertens et al. |
| 7,582,705 B2 | 9/2009 | Dairoku et al. |
| 7,745,537 B2 | 6/2010 | Nakashima et al. |
| 7,750,085 B2 | 7/2010 | Torii et al. |
| 7,803,880 B2 | 9/2010 | Torii et al. |
| 7,816,445 B2 | 10/2010 | Dairoku et al. |
| 7,851,550 B2 | 12/2010 | Kadonaga et al. |
| 7,879,923 B2 | 2/2011 | Matsumoto et al. |
| 7,960,469 B2 | 6/2011 | Adachi et al. |
| 8,198,209 B2 | 6/2012 | Torii et al. |
| 8,309,654 B2 | 11/2012 | Miyake et al. |
| 8,430,960 B2 | 4/2013 | Sumakeris et al. |
| 8,481,664 B2 | 7/2013 | Dairoku et al. |
| 8,497,226 B2 | 7/2013 | Torii et al. |
| 8,552,134 B2 | 10/2013 | Fujimaru et al. |
| 8,596,931 B2 | 12/2013 | Nagashima et al. |
| 2001/0025093 A1 | 9/2001 | Ishizaki et al. |
| 2001/0046867 A1 | 11/2001 | Mizoguchi |
| 2001/0053807 A1 | 12/2001 | Miyake et al. |
| 2001/0053826 A1 | 12/2001 | Hosokawa et al. |
| 2002/0013394 A1 | 1/2002 | Dairoku et al. |
| 2002/0040095 A1 | 4/2002 | Dairoku et al. |
| 2002/0072471 A1 | 6/2002 | Ikeuchi et al. |
| 2002/0120074 A1 | 8/2002 | Wada et al. |
| 2002/0120085 A1 | 8/2002 | Matsumoto et al. |
| 2002/0127166 A1 | 9/2002 | Bergeron et al. |
| 2002/0128618 A1 | 9/2002 | Frenz et al. |
| 2002/0161132 A1 | 10/2002 | Irie et al. |
| 2002/0165288 A1 | 11/2002 | Frenz et al. |
| 2002/0169252 A1 | 11/2002 | Wilson |
| 2002/0193492 A1 | 12/2002 | Wilson |
| 2003/0020199 A1 | 1/2003 | Kajikawa et al. |
| 2003/0060112 A1 | 3/2003 | Rezai et al. |
| 2003/0065215 A1 | 4/2003 | Sakamoto et al. |
| 2003/0069359 A1 | 4/2003 | Torii et al. |
| 2003/0087983 A1 | 5/2003 | Kajikawa et al. |
| 2003/0092849 A1 | 5/2003 | Dairoku et al. |
| 2003/0100830 A1 | 5/2003 | Zhong et al. |
| 2003/0118820 A1 | 6/2003 | Sun et al. |
| 2003/0118821 A1 | 6/2003 | Sun et al. |
| 2003/0153887 A1 | 8/2003 | Nawata et al. |
| 2003/0207997 A1* | 11/2003 | Mertens .............. A61L 15/48 525/244 |
| 2004/0018365 A1 | 1/2004 | Krautkramer et al. |
| 2004/0019342 A1 | 1/2004 | Nagasuna et al. |
| 2004/0024104 A1 | 2/2004 | Ota et al. |
| 2004/0042952 A1 | 3/2004 | Bergeron et al. |
| 2004/0050679 A1 | 3/2004 | Hammon et al. |
| 2004/0071966 A1 | 4/2004 | Inger et al. |
| 2004/0106745 A1 | 6/2004 | Nakashima et al. |
| 2004/0110006 A1 | 6/2004 | Ishizaki et al. |
| 2004/0110897 A1 | 6/2004 | Sakamoto et al. |
| 2004/0110913 A1 | 6/2004 | Kanto et al. |
| 2004/0110914 A1 | 6/2004 | Nakahara et al. |
| 2004/0157734 A1 | 8/2004 | Mertens et al. |
| 2004/0176544 A1 | 9/2004 | Mertens et al. |
| 2004/0180189 A1 | 9/2004 | Funk et al. |
| 2004/0181031 A1 | 9/2004 | Nogi et al. |
| 2004/0213892 A1 | 10/2004 | Jonas et al. |
| 2004/0236049 A1 | 11/2004 | Fuchs et al. |
| 2004/0242761 A1 | 12/2004 | Dairoku et al. |
| 2005/0000671 A1 | 1/2005 | Ishii et al. |
| 2005/0013865 A1 | 1/2005 | Nestler et al. |
| 2005/0020780 A1 | 1/2005 | Inger et al. |
| 2005/0048221 A1 | 3/2005 | Irie et al. |
| 2005/0049379 A1 | 3/2005 | Adachi et al. |
| 2005/0070071 A1 | 3/2005 | Henley et al. |
| 2005/0070671 A1 | 3/2005 | Torii et al. |
| 2005/0080194 A1 | 4/2005 | Satake et al. |
| 2005/0101680 A1 | 5/2005 | Sun et al. |
| 2005/0113542 A1 | 5/2005 | Irie et al. |
| 2005/0118423 A1 | 6/2005 | Adachi et al. |
| 2005/0154146 A1 | 7/2005 | Burgert |
| 2005/0176910 A1 | 8/2005 | Jaworek et al. |
| 2005/0209352 A1 | 9/2005 | Dairoku et al. |
| 2005/0209411 A1 | 9/2005 | Nestler et al. |
| 2005/0215734 A1 | 9/2005 | Dairoku et al. |
| 2005/0215752 A1 | 9/2005 | Popp et al. |
| 2005/0221980 A1 | 10/2005 | Adachi et al. |
| 2005/0222459 A1 | 10/2005 | Nordhoff et al. |
| 2005/0222547 A1 | 10/2005 | Beruda et al. |
| 2005/0234413 A1 | 10/2005 | Funk et al. |
| 2005/0245684 A1* | 11/2005 | Daniel .............. A61L 15/24 525/178 |
| 2005/0256469 A1 | 11/2005 | Qin et al. |
| 2005/0272600 A1 | 12/2005 | Wada et al. |
| 2005/0288182 A1 | 12/2005 | Torii et al. |
| 2006/0020078 A1 | 1/2006 | Popp et al. |
| 2006/0025536 A1 | 2/2006 | Dairoku et al. |
| 2006/0036043 A1 | 2/2006 | Nestler et al. |
| 2006/0073969 A1 | 4/2006 | Torii et al. |
| 2006/0074160 A1* | 4/2006 | Handa .............. A61F 13/53 524/284 |
| 2006/0079630 A1 | 4/2006 | Himori et al. |
| 2006/0089512 A1 | 4/2006 | Bennett et al. |
| 2006/0204755 A1 | 9/2006 | Torii et al. |
| 2006/0229413 A1 | 10/2006 | Torii et al. |
| 2007/0078231 A1 | 4/2007 | Shibata et al. |
| 2007/0101939 A1 | 5/2007 | Sumakeris et al. |
| 2007/0106013 A1 | 5/2007 | Adachi et al. |
| 2007/0149691 A1 | 6/2007 | Ishizaki et al. |
| 2007/0149716 A1 | 6/2007 | Funk et al. |

(56) References Cited

U.S. PATENT DOCUMENTS

| | | |
|---|---|---|
| 2007/0203280 A1 | 8/2007 | Okochi |
| 2007/0207924 A1 | 9/2007 | Ikeuchi et al. |
| 2007/0225422 A1 | 9/2007 | Sakamoto et al. |
| 2007/0239124 A1 | 10/2007 | Handa et al. |
| 2007/0254177 A1 | 11/2007 | Smith et al. |
| 2008/0021131 A1 | 1/2008 | Mertens et al. |
| 2008/0032888 A1 | 2/2008 | Nakamura et al. |
| 2008/0119586 A1 | 5/2008 | Byerly et al. |
| 2008/0119626 A1 | 5/2008 | Fujimaru et al. |
| 2008/0125533 A1 | 5/2008 | Riegel et al. |
| 2008/0139693 A1 | 6/2008 | Ikeuchi et al. |
| 2008/0161512 A1 | 7/2008 | Kawano et al. |
| 2008/0166410 A1 | 7/2008 | Funk et al. |
| 2009/0036855 A1 | 2/2009 | Wada et al. |
| 2009/0186542 A1 | 7/2009 | Kondo et al. |
| 2009/0234314 A1 | 9/2009 | Nakamura et al. |
| 2009/0239966 A1 | 9/2009 | Matsumoto et al. |
| 2009/0312183 A1* | 12/2009 | Fujimaru ............ A61L 15/24 502/402 |
| 2010/0119312 A1 | 5/2010 | Nagashima et al. |
| 2010/0160883 A1 | 6/2010 | Jonas et al. |
| 2011/0301560 A1 | 12/2011 | Fujimura et al. |
| 2012/0184670 A1 | 7/2012 | Kobayashi et al. |
| 2012/0298913 A1 | 11/2012 | Kondo et al. |
| 2014/0054497 A1 | 2/2014 | Wattebled et al. |

FOREIGN PATENT DOCUMENTS

| | | |
|---|---|---|
| CA | 2 426 514 A1 | 3/2003 |
| CA | 2 426 802 A1 | 4/2003 |
| CN | 1181272 A | 5/1998 |
| CN | 1204665 A | 1/1999 |
| CN | 1344756 A | 4/2002 |
| CN | 1610707 A | 4/2005 |
| DE | 4418818 A1 | 1/1995 |
| DE | 10221202 A1 | 7/2003 |
| EP | 0 001 706 A1 | 5/1979 |
| EP | 0 205 674 A1 | 12/1986 |
| EP | 0 304 319 A2 | 2/1989 |
| EP | 0 339 461 A1 | 11/1989 |
| EP | 0 349 240 A2 | 1/1990 |
| EP | 0 450 923 A2 | 10/1991 |
| EP | 0 454 497 A2 | 10/1991 |
| EP | 0 456 136 A2 | 11/1991 |
| EP | 0 461 613 A1 | 12/1991 |
| EP | 0 481 443 A1 | 4/1992 |
| EP | 0 493 011 A2 | 7/1992 |
| EP | 0513780 A1 | 11/1992 |
| EP | 0 521 355 A1 | 1/1993 |
| EP | 0 530 517 A1 | 3/1993 |
| EP | 0 532 002 A1 | 3/1993 |
| EP | 0 603 292 A1 | 6/1994 |
| EP | 0 605 150 A1 | 7/1994 |
| EP | 0 605 215 A1 | 7/1994 |
| EP | 0 621 041 A1 | 10/1994 |
| EP | 0 627 411 A1 | 12/1994 |
| EP | 0 629 411 A1 | 12/1994 |
| EP | 0 629 441 A1 | 12/1994 |
| EP | 0 668 080 A2 | 8/1995 |
| EP | 0 695 763 A1 | 2/1996 |
| EP | 0 707 603 A1 | 4/1996 |
| EP | 0 712 659 A1 | 5/1996 |
| EP | 0 761 241 A2 | 3/1997 |
| EP | 0 811 636 A1 | 12/1997 |
| EP | 0 812 873 A1 | 12/1997 |
| EP | 0 837 076 A2 | 4/1998 |
| EP | 0 844 270 A1 | 5/1998 |
| EP | 0 889 063 A1 | 1/1999 |
| EP | 0 922 717 A1 | 6/1999 |
| EP | 0 937 739 A2 | 8/1999 |
| EP | 0 940 148 A1 | 9/1999 |
| EP | 0 942 014 A2 | 9/1999 |
| EP | 0 955 086 A2 | 11/1999 |
| EP | 1 029 886 A2 | 8/2000 |
| EP | 1 072 630 A1 | 1/2001 |
| EP | 1 113 037 A2 | 7/2001 |
| EP | 1 130 045 A2 | 9/2001 |
| EP | 1 153 656 A2 | 11/2001 |
| EP | 1 169 379 A1 | 1/2002 |
| EP | 1 178 059 A2 | 2/2002 |
| EP | 1 191 051 A2 | 3/2002 |
| EP | 1 275 669 A1 | 1/2003 |
| EP | 1 302 485 A1 | 4/2003 |
| EP | 1 315 770 A1 | 6/2003 |
| EP | 1 364 985 A1 | 11/2003 |
| EP | 1 374 919 A2 | 1/2004 |
| EP | 1 422 257 A1 | 5/2004 |
| EP | 1 457 541 A1 | 9/2004 |
| EP | 1 462 473 A1 | 9/2004 |
| EP | 1 510 229 A1 | 3/2005 |
| EP | 1 516 884 A2 | 3/2005 |
| EP | 1 577 349 A1 | 9/2005 |
| EP | 1 589 040 A1 | 10/2005 |
| EP | 1 598 392 A2 | 11/2005 |
| EP | 1 801 128 A2 | 6/2007 |
| EP | 2 135 669 A1 | 12/2009 |
| GB | 0 235 307 A | 6/1925 |
| GB | 2 088 392 A | 6/1982 |
| GB | 2 267 094 A | 11/1993 |
| JP | 53-046389 B2 | 4/1978 |
| JP | 54-037188 | 3/1979 |
| JP | 55-038863 | 3/1980 |
| JP | 55-133413 | 10/1980 |
| JP | 56-133028 | 10/1981 |
| JP | 56-136808 | 10/1981 |
| JP | 57-073007 | 5/1982 |
| JP | 57-094011 | 6/1982 |
| JP | 57-158209 | 9/1982 |
| JP | 58-501107 | 7/1983 |
| JP | 58-180233 | 10/1983 |
| JP | 59-062665 | 4/1984 |
| JP | 59-080459 | 5/1984 |
| JP | 59-129232 | 7/1984 |
| JP | 60-055002 | 3/1985 |
| JP | 60-071623 | 4/1985 |
| JP | 60-158861 | 8/1985 |
| JP | 60-163956 | 8/1985 |
| JP | 60-245608 A | 12/1985 |
| JP | 61-016903 | 1/1986 |
| JP | 61-046241 | 3/1986 |
| JP | 61-087702 | 5/1986 |
| JP | 61-97333 | 5/1986 |
| JP | 61-257235 | 11/1986 |
| JP | 62-007745 | 1/1987 |
| JP | 62-227904 | 10/1987 |
| JP | 62-270607 | 11/1987 |
| JP | 63-105064 | 5/1988 |
| JP | 63-270741 | 11/1988 |
| JP | 63-297408 | 12/1988 |
| JP | 64-056707 | 3/1989 |
| JP | 01-126310 | 5/1989 |
| JP | 01-126314 | 5/1989 |
| JP | 02-049002 | 2/1990 |
| JP | 02-191604 | 7/1990 |
| JP | 02-196802 A | 8/1990 |
| JP | 02-255804 | 10/1990 |
| JP | 02-300210 | 12/1990 |
| JP | 03-052903 | 3/1991 |
| JP | 03-095204 | 4/1991 |
| JP | 03-179008 | 5/1991 |
| JP | 04-175319 B2 | 6/1992 |
| JP | 04-227705 A | 8/1992 |
| JP | 05-202199 B2 | 8/1993 |
| JP | 05-508674 | 12/1993 |
| JP | 06-041319 | 2/1994 |
| JP | 06-039485 | 3/1994 |
| JP | 06-057010 | 3/1994 |
| JP | 06-080818 | 3/1994 |
| JP | 06-107846 | 4/1994 |
| JP | 06-122708 | 5/1994 |
| JP | 06-158658 | 6/1994 |
| JP | 06-199969 | 7/1994 |
| JP | 06-211934 | 8/1994 |

(56) References Cited

FOREIGN PATENT DOCUMENTS

| | | |
|---|---|---|
| JP | 06-220227 | 8/1994 |
| JP | 06-262072 | 9/1994 |
| JP | 07-008883 | 1/1995 |
| JP | 07-145326 A | 6/1995 |
| JP | 07-224204 | 8/1995 |
| JP | 07-228788 | 8/1995 |
| JP | 07-242709 | 9/1995 |
| JP | 08-027278 | 1/1996 |
| JP | 08-052203 | 2/1996 |
| JP | 08-057311 | 3/1996 |
| JP | 08-143782 | 6/1996 |
| JP | 08-176311 | 7/1996 |
| JP | 08-188602 | 7/1996 |
| JP | 02-530668 B2 | 9/1996 |
| JP | 08-283318 | 10/1996 |
| JP | 09-077832 | 3/1997 |
| JP | 09-124710 | 5/1997 |
| JP | 09-124879 | 5/1997 |
| JP | 09-136966 | 5/1997 |
| JP | 09-235378 | 9/1997 |
| JP | 09-509591 | 9/1997 |
| JP | 09-278900 | 10/1997 |
| JP | 09-290000 | 11/1997 |
| JP | 10-045812 | 2/1998 |
| JP | 10-075999 | 3/1998 |
| JP | 10-114801 | 5/1998 |
| JP | 10-147724 | 6/1998 |
| JP | 10-273602 | 10/1998 |
| JP | 02-847113 B2 | 1/1999 |
| JP | 11-071425 A | 3/1999 |
| JP | 11-071529 | 3/1999 |
| JP | 02-881739 B2 | 4/1999 |
| JP | 02-883330 B1 | 4/1999 |
| JP | 11-106514 | 4/1999 |
| JP | 11-240959 | 9/1999 |
| JP | 11-241030 | 9/1999 |
| JP | 11-254429 | 9/1999 |
| JP | 11-258229 | 9/1999 |
| JP | 11-302391 | 11/1999 |
| JP | 11-315147 | 11/1999 |
| JP | 02-995276 B2 | 12/1999 |
| JP | 2000-026738 A | 1/2000 |
| JP | 2000-053729 A | 2/2000 |
| JP | 03-023203 B2 | 3/2000 |
| JP | 03-028203 B2 | 4/2000 |
| JP | 03-031306 B2 | 4/2000 |
| JP | 2000-093792 A | 4/2000 |
| JP | 2000-095965 A | 4/2000 |
| JP | 2000-290381 A | 10/2000 |
| JP | 2000-302876 A | 10/2000 |
| JP | 2000-327926 A | 11/2000 |
| JP | 03-115313 B2 | 12/2000 |
| JP | 2001-011341 A | 1/2001 |
| JP | 2001-031770 | 2/2001 |
| JP | 2001-040013 A | 2/2001 |
| JP | 2001-040014 A | 2/2001 |
| JP | 2001-096151 A | 4/2001 |
| JP | 2001-098170 A | 4/2001 |
| JP | 2001-137704 A | 5/2001 |
| JP | 2001-224959 A | 8/2001 |
| JP | 2001-226416 A | 8/2001 |
| JP | 2001-252307 A | 9/2001 |
| JP | 2001-523287 A | 11/2001 |
| JP | 2001-523289 A | 11/2001 |
| JP | 2002-035580 A | 2/2002 |
| JP | 2002-085959 A | 3/2002 |
| JP | 2002-121291 A | 4/2002 |
| JP | 03-283570 B2 | 5/2002 |
| JP | 2002-513043 A | 5/2002 |
| JP | 2002-513059 A | 5/2002 |
| JP | 2002-515079 A | 5/2002 |
| JP | 2002-212204 A | 7/2002 |
| JP | 2002-523526 A | 7/2002 |
| JP | 2002-241627 A | 8/2002 |
| JP | 2002-527547 A | 8/2002 |
| JP | 2002-265528 A | 9/2002 |
| JP | 2002-538275 A | 11/2002 |
| JP | 2002-539281 A | 11/2002 |
| JP | 2003-503554 A | 1/2003 |
| JP | 2003-062460 A | 3/2003 |
| JP | 2003-082250 A | 3/2003 |
| JP | 2003-088553 A | 3/2003 |
| JP | 2003-088554 A | 3/2003 |
| JP | 2003-511489 A | 3/2003 |
| JP | 2003-105092 A | 4/2003 |
| JP | 2003-516431 A | 5/2003 |
| JP | 2003-165883 A | 6/2003 |
| JP | 2003-206381 A | 7/2003 |
| JP | 2003-523484 A | 8/2003 |
| JP | 2003-246810 A | 9/2003 |
| JP | 2003-261601 A | 9/2003 |
| JP | 2003-306609 A | 10/2003 |
| JP | 2003-529647 A | 10/2003 |
| JP | 2004-001355 A | 1/2004 |
| JP | 2004-002891 A | 1/2004 |
| JP | 03-501493 B2 | 3/2004 |
| JP | 2004-509196 A | 3/2004 |
| JP | 2004-121400 A | 4/2004 |
| JP | 2004-512165 A | 4/2004 |
| JP | 2004-210924 A | 7/2004 |
| JP | 2004-217911 A | 8/2004 |
| JP | 2004-261796 A | 9/2004 |
| JP | 2004-261797 A | 9/2004 |
| JP | 2004-300425 A | 10/2004 |
| JP | 2004-339678 A | 12/2004 |
| JP | 2004-352941 A | 12/2004 |
| JP | 2005-054050 A | 3/2005 |
| JP | 2005-081204 A | 3/2005 |
| JP | 2005-097585 | 4/2005 |
| JP | 2005-105254 A | 4/2005 |
| JP | 2005-288265 A | 10/2005 |
| JP | 2006-008963 A | 1/2006 |
| JP | 2006-068731 A | 3/2006 |
| JP | 04-046617 B2 | 2/2008 |
| JP | 2008-523196 A | 7/2008 |
| JP | 2008-534695 A | 8/2008 |
| JP | 04-214734 B2 | 1/2009 |
| JP | 2010-065107 A | 3/2010 |
| JP | 05-040780 B2 | 10/2012 |
| JP | 05-156034 B2 | 3/2013 |
| JP | 05-200068 B2 | 5/2013 |
| JP | 05-209022 B2 | 6/2013 |
| RU | 2 106 153 C1 | 3/1998 |
| RU | 2 183 648 C2 | 6/2002 |
| RU | 2 193 045 C2 | 11/2002 |
| SU | 1797612 | 8/1988 |
| SU | 1777603 | 11/1992 |
| TW | 228528 | 8/1994 |
| TW | 396173 B | 7/2000 |
| TW | 399062 B | 7/2000 |
| TW | 422866 B | 2/2001 |
| TW | 432092 B | 5/2001 |
| WO | WO-1989/005327 A1 | 6/1989 |
| WO | WO-1992/001008 A1 | 1/1992 |
| WO | WO-1993/005080 A1 | 3/1993 |
| WO | WO-1995/002002 A1 | 1/1995 |
| WO | WO-1995/005856 A1 | 3/1995 |
| WO | WO-1995/022355 A1 | 8/1995 |
| WO | WO-1995/022356 A1 | 8/1995 |
| WO | WO-1995/022358 A1 | 8/1995 |
| WO | WO-1995/026209 A1 | 10/1995 |
| WO | WO-1995/033558 A1 | 12/1995 |
| WO | WO-1996/007437 A1 | 3/1996 |
| WO | WO-1996/038296 A1 | 12/1996 |
| WO | WO-1997/037695 A1 | 10/1997 |
| WO | WO-1998/037149 A1 | 8/1998 |
| WO | WO-1998/048857 A1 | 11/1998 |
| WO | WO-1998/049221 A1 | 11/1998 |
| WO | WO-1998/052979 A1 | 11/1998 |
| WO | WO-1999/038541 A1 | 8/1999 |
| WO | WO-1999/055393 A1 | 11/1999 |
| WO | WO-1999/055767 A1 | 11/1999 |
| WO | WO-1999/063923 A1 | 12/1999 |
| WO | WO-2000/010619 A1 | 3/2000 |

(56) References Cited

FOREIGN PATENT DOCUMENTS

| WO | WO-2000/038607 A1 | 7/2000 |
|---|---|---|
| WO | WO-2000/053644 A1 | 9/2000 |
| WO | WO-2000/053664 A1 | 9/2000 |
| WO | WO-2000/055245 A1 | 9/2000 |
| WO | WO-2000/062730 A1 | 10/2000 |
| WO | WO-2000/063492 A1 | 10/2000 |
| WO | 0135886 A1 | 5/2001 |
| WO | WO-2001/045758 A1 | 6/2001 |
| WO | WO-2001/066056 A1 | 9/2001 |
| WO | WO-2001/068156 A1 | 9/2001 |
| WO | WO-2001/068375 A2 | 9/2001 |
| WO | WO-2001/074913 A1 | 10/2001 |
| WO | WO-2001/089591 A2 | 11/2001 |
| WO | WO-2001/093977 A2 | 12/2001 |
| WO | WO-2001/098382 A1 | 12/2001 |
| WO | WO-2002/007791 A2 | 1/2002 |
| WO | WO-2002/020068 A1 | 3/2002 |
| WO | WO-2002/022717 A1 | 3/2002 |
| WO | WO-2002/034384 A2 | 5/2002 |
| WO | WO-2002/053198 A1 | 7/2002 |
| WO | WO-2002/053199 A1 | 7/2002 |
| WO | WO-2002/0100451 A2 | 12/2002 |
| WO | WO-2003/004550 A1 | 1/2003 |
| WO | WO-2003/014172 A2 | 2/2003 |
| WO | WO-2003/026707 A2 | 4/2003 |
| WO | WO-2003/051415 A1 | 6/2003 |
| WO | WO-2003/051940 A1 | 6/2003 |
| WO | WO-2003/078378 A1 | 9/2003 |
| WO | WO-2003/095510 A1 | 11/2003 |
| WO | WO-2004/003036 A1 | 1/2004 |
| WO | WO-2004/011046 A1 | 2/2004 |
| WO | WO-2004/018005 A1 | 3/2004 |
| WO | WO-2004/024816 A1 | 3/2004 |
| WO | WO-2004/052819 A2 | 6/2004 |
| WO | WO-2004/052949 A1 | 6/2004 |
| WO | WO-2004/061010 A1 | 7/2004 |
| WO | WO-2004/069293 A1 | 8/2004 |
| WO | WO-2004/069404 A1 | 8/2004 |
| WO | WO-2004/069915 A2 | 8/2004 |
| WO | WO-2004/069936 A1 | 8/2004 |
| WO | WO-2004/093930 A1 | 11/2004 |
| WO | WO-2004/113452 A1 | 12/2004 |
| WO | WO-2005/027986 A1 | 3/2005 |
| WO | WO-2005/075070 A1 | 8/2005 |
| WO | WO-2005/097313 A1 | 10/2005 |
| WO | WO-2006/062253 A1 | 6/2006 |
| WO | WO-2006/062258 A2 | 6/2006 |
| WO | WO-2006/063229 A2 | 6/2006 |
| WO | WO-2006/109844 A1 | 10/2006 |
| WO | WO-2006/109882 A1 | 10/2006 |
| WO | WO-2007/032565 A1 | 3/2007 |
| WO | WO-2007/037522 A1 | 4/2007 |
| WO | WO-2007/116777 A1 | 10/2007 |
| WO | WO-2008/015980 A1 | 2/2008 |
| WO | WO-2008/120742 A1 | 10/2008 |
| WO | WO-2009/048160 A1 | 4/2009 |
| WO | WO-2010/029074 A2 | 3/2010 |
| WO | WO-2010/073658 A1 | 7/2010 |

OTHER PUBLICATIONS

Abstract of JP 2000-026738 published on Jan. 25, 2000.
Advisory Action dated Feb. 4, 2015 issued in U.S. Appl. No. 12/083,238.
Affidavit of 10016041 (further experimental reproductions by Dr. Speyerer) dated Oct. 30, 2014.
Affidavit of Dr. Christian Speyerer dated Nov. 14, 2015.
Affidavit of Dr. Christian Speyerer dated Nov. 14, 2015 with Full English Translation.
Affidavit, Dr. Christian Speyerer, pp. 1-3.
Appeal brief dated Oct. 30, 2014 submitted by an opponent against European Patent No. EP 1 641 883—Full English translation provided.
BASF Acrylic Acid Glacial, Technical Data Sheet, Mar. 2001.
Belle Lowe (http://www.chestofbooks.com/food/science/Experimental-Cookery/Starch-Part-3.html). Book published 1943.
Buchholz et al., *Solution Polymerization*, Modern Superabsorbent Polymer Technology, p. 93, 1997.
Buchholz, F.L., et al. (1997) "Modern superabsorbent polymer technology", *Wiley-VCH*, pp. 149-153.
Buchholz, F.L., et al. (1997) "Modern superabsorbent polymer technology", *Wiley-VCH*, pp. 178.
Buchholz, F.L., et al. (1997) "Modern superabsorbent polymer technology", *Wiley-VCH*, pp. 192-221.
*Chemistry/Engineering Handbook*, modified version No. 6, edited by Chemistry/Engineering Committee, Maruzen Co. 1999.
Chinese Office Action dated Jul. 17, 2009 issued in Chinese Application No. 200680011103.1 with English translation.
Chinese Office Action dated May 18, 2007 issued in Chinese Application No. 200510076831.8 with English translation.
Chinese Office Action dated Dec. 23, 2013 issued in Chinese Application No. 201210313591.9 with English translation.
Communication pursuant to Rule 114(2) EPC dated Oct. 30, 2014 issued in EP Patent Application No. 05709754.5, which corresponds to Co-pending U.S. Appl. No. 11/049,995.
Database WPI Week 200454, Thomas Scientific, London, UK, AN 2004-561593, XP002555199.
Decision rejecting the opposition dated Jun. 24, 2014 issued in EP Application No. 04746711.3.
Decision to Grant a Patent for an Invention dated Nov. 12, 2008 issued in Russian Application No. 2007141544/04.
Decision to Grant a Patent for an Invention dated Dec. 6, 2007 issued in Russian Application No. 2005140797/04 with English translation.
Decision to Grant dated Aug. 14, 2009 issued in Russian Application No. 2007140959 with English translation.
Declaration by Dr. Scott Smith (2016).
Definition of "contain" from Merriam-Webster online dictionary, Apr. 2009.
Definition of "involve" from Merriam-Webster online dictionary, Apr. 2009.
Delivery Note No. 89077237 dated May 19, 1999.
Delivery Note No. 89097648 dated Aug. 24, 1999.
European Communication dated Nov. 20, 2015 issued in European Patent Application No. 1641883 with full English Translation.
European Office Action dated Nov. 17, 2015 issued in European Patent Application No. EP 04746711.3.
European Office Action dated Nov. 17, 2015 issued in European Patent Application No. EP 04746711.3—English Translation.
European Office Action dated Dec. 2, 2005 issued in European Application No. 05013153.1.
European Office Action dated Apr. 8, 2015 issued in European Patent Application No. 10183241.8.
European Search Report dated Aug. 1, 2007 issued in European Application No. 07005807.8.
European Search Report dated Dec. 1, 2009 issued in European Application No. 06731732.1.
European Search Report dated Jun. 11, 2007 issed in European Application No. 07005807.8.
European Search Report dated Dec. 2, 2009 issued in European Application No. 06731728.9.
European Search Report dated Nov. 26, 2007 issued in European Application No. 06026348.0.
European Search Report dated Jun. 3, 2008 issued in European Application No. 06026110.4.
Hammer mill (Technology), <http://de.wikipedia.org/wiki/Hammermühle (Technik)>, printed Apr. 24, 2011.
Hearing Notice dated Sep. 25, 2014 issued in Indian Application No. 5101/delnp/2006.
http://www.home-water-purifiers-and-filters.com/carbon-water-filter.php, 2011.
Indian Office Action dated Jun. 9, 2011 issued in Indian Application No. 564/CHENP/2008.
International Search Report and International Preliminary Examination Report dated Oct. 12, 2004 issued in PCT Application No. PCT/JP2004/009242.

(56) References Cited

OTHER PUBLICATIONS

International Search Report dated Jan. 18, 2011 issued in Japanese Application No. PCT/JP2010/066957 with English translation.
International Search Report dated Apr. 25, 2006 issued in PCT Application No. PCT/JP2006/304895.
International Search Report dated Dec. 5, 2005 issued in PCT Application No. PCT/JP2005/018073.
International Search Report dated Sep. 5, 2006 issued in PCT Application No. PCT/JP2006/311637.
Japanese Office Action dated Jul. 10, 2012 in Japanese Application No. 2007-080101 with English Translation.
Japanese Office Action dated Apr. 23, 2013 issued in Japanese Application No. 2007-080101 with English translation.
Japanese Office Action dated Mar. 29, 2011 issued in Japanese Application No. 2005-127818 with English translation.
Japanese Office Action dated Dec. 7, 2010 issued in Japanese Application No. 2005-127818 with English translation.
Korean Office Action dated Oct. 27, 2008 issued in Korean Application No. 10-2007-7022676 with English translation.
Kurimoto Powder System, *Continuous Kneading & Reacting System: KRC Kneader*, <http://www.kurimoto.co.jp/english/powdersystem/products/krc_Kneader.html>, printed Apr. 24, 2011.
Minutes on the hearing of evidence dated Mar. 20, 2012 concerning European patent No. EP 0 812 873—Full English translation provided.
Notice of Allowance dated Apr. 3, 2015 issued in U.S. Appl. No. 11/723,822.
Notice of Allowance dated Oct. 7, 2014 issued in U.S. Appl. No. 13/498,780.
Notice of Opposition dated Oct. 17, 2012 issued in EP Application No. 04773399.3 with English translation.
Notice of Opposition dated Apr. 28, 2011 issued in European Application No. 04021015.5 with English translation.
Notice of Opposition dated Oct. 28, 2013 issued in European Application No. 06731728.9 with English translation.
Notice of Panel Decision dated Aug. 22, 2017 issued in U.S. Appl. No. 12/083,238.
Office Action dated Apr. 1, 2010 issued in U.S. Appl. No. 11/883,621.
Office Action dated Apr. 1, 2014 issued in Japanese Application No. 2007-080101 with full English Translation.
Office Action dated Aug. 1, 2012 issued in U.S. Appl. No. 11/693,355.
Office Action dated Jun. 1, 2006 issued in U.S. Appl. No. 10/933,319.
Office Action dated Jan. 10, 2011 issued in U.S. Appl. No. 12/805,685.
Office Action dated Nov. 10, 2016 issued in U.S. Appl. No. 12/083,238.
Office Action dated Jul. 11, 2012 issued in U.S. Appl. No. 11/883,621.
Office Action dated Feb. 12, 2014 issued in U.S. Appl. No. 11/883,929.
Office Action dated May 13, 2016 issued in U.S. Appl. No. 12/083,238.
Office Action dated Aug. 14, 2013 issued in U.S. Appl. No. 13/498,780.
Office Action dated Dec. 14, 2012 issued in U.S. Appl. No. 11/723,822.
Office Action dated Jul. 14, 2009 issued in U.S. Appl. No. 11/723,822.
Office Action dated Jun. 14, 2010 issued in U.S. Appl. No. 10/562,140.
Office Action dated Mar. 14, 2007 issued in U.S. Appl. No. 10/562,140.
Office Action dated May 14, 2008 issued in U.S. Appl. No. 11/152,195.
Office Action dated Sep. 14, 2009 issued in U.S. Appl. No. 11/883,929.
Office Action dated Apr. 15, 2008 issued in U.S. Appl. No. 10/562,140.
Office Action dated Apr. 15, 2009 issued in U.S. Appl. No. 11/373,215.
Office Action dated Jun. 15, 2009 issued in U.S. Appl. No. 11/693,355.
Office Action dated Oct. 15, 2009 issued in U.S. Appl. No. 11/152,195.
Office Action dated Oct. 16, 2008 issued in U.S. Appl. No. 10/933,319.
Office Action dated Sep. 16, 2008 issued in U.S. Appl. No. 10/562,140.
Office Action dated Dec. 17, 2013 issued in U.S. Appl. No. 11/883,929.
Office Action dated Feb. 17, 2012 issued in U.S. Appl. No. 10/933,319.
Office Action dated Mar. 17, 2009 issued in U.S. Appl. No. 10/572,565.
Office Action dated May 17, 2016 issued in U.S. Appl. No. 14/563,877.
Office Action dated Nov. 17, 2009 issued in U.S. Appl. No. 11/579,603.
Office Action dated Dec. 18, 2009 issued in U.S. Appl. No. 11/638,580.
Office Action dated Jun. 18, 2007 issued in U.S. Appl. No. 11/049,995.
Office Action dated Mar. 18, 2010 issued in U.S. Appl. No. 11/883,929.
Office Action dated Mar. 18, 2011 issued in U.S. Appl. No. 11/883,621.
Office Action dated Nov. 18, 2008 issued in U.S. Appl. No. 11/049,995.
Office Action dated Nov. 18, 2010 issued in U.S. Appl. No. 10/562,140.
Office Action dated Oct. 18, 2007 issued in U.S. Appl. No. 10/933,319.
Office Action dated Oct. 18, 2010 issued in U.S. Appl. No. 11/883,621.
Office Action dated Sep. 18, 2009 issued in U.S. Appl. No. 11/641,885.
Office Action dated Jan. 2, 2015 issued in U.S. Appl. No. 11/723,822.
Office Action dated Mar. 2, 2009 issued in U.S. Appl. No. 11/579,603.
Office Action dated Nov. 2, 2007 issued in U.S. Appl. No. 11/449,666.
Office Action dated Oct. 2, 2013 issued in U.S. Appl. No. 13/498,780.
Office Action dated Jul. 20, 2011 issued in U.S. Appl. No. 10/933,319.
Office Action dated Mar. 20, 2008 issued in U.S. Appl. No. 10/933,319.
Office Action dated Aug. 21, 2014 issued in U.S. Appl. No. 11/723,822.
Office Action dated Dec. 21, 2009 issued in U.S. Appl. No. 11/723,822.
Office Action dated Dec. 21, 2010 issued in U.S. Appl. No. 11/579,603.
Office Action dated Jan. 21, 2009 issued in U.S. Appl. No. 11/638,580.
Office Action dated Jun. 21, 2007 issued in U.S. Appl. No. 11/449,666.
Office Action dated Mar. 21, 2014 issued in U.S. Appl. No. 11/723,822.
Office Action dated May 21, 2010 issued in U.S. Appl. No. 11/638,580.
Office Action dated Oct. 21, 2015 issued in U.S. Appl. No. 12/083,238.
Office Action dated Mar. 22, 2010 issued in U.S. Appl. No. 11/641,885.
Office Action dated Oct. 22, 2013 issued in U.S. Appl. No. 11/723,822.
Office Action dated Dec. 23, 2013 issued in U.S. Appl. No. 12/083,238.
Office Action dated Oct. 23, 2006 issued in U.S. Appl. No. 10/933,319.
Office Action dated Sep. 23, 2011 issued in U.S. Appl. No. 12/083,238.
Office Action dated Dec. 24, 2008 issued in U.S. Appl. No. 11/373,215.
Office Action dated Sep. 25, 2014 issued in U.S. Appl. No. 12/083,238.
Office Action dated Feb. 26, 2010 issued in U.S. Appl. No. 11/693,355.
Office Action dated Jan. 26, 2017 Issued in U.S. Appl. No. 14/563,877.
Office Action dated Jun. 26, 2009 issued in U.S. Appl. No. 11/638,580.
Office Action dated Mar. 26, 2013 issued in U.S. Appl. No. 11/883,621.
Office Action dated Nov. 27, 2009 issued in U.S. Appl. No. 11/693,355.
Office Action dated Aug. 28, 2012 issued in U.S. Appl. No. 12/805,685.
Office Action dated Feb. 28, 2007 issued in U.S. Appl. No. 10/933,319.
Office Action dated Nov. 28, 2012 issued in U.S. Appl. No. 11/693,355.
Office Action dated Oct. 28, 2008 issued in U.S. Appl. No. 11/152,195.
Office Action dated Oct. 28, 2009 issued in U.S. Appl. No. 10/572,565.
Office Action dated Sep. 28, 2007 issued in U.S. Appl. No. 10/562,140.
Office Action dated Mar. 3, 2017 issued in U.S. Appl. No. 12/083,238.
Office Action dated Apr. 30, 2007 issued in U.S. Appl. No. 11/449,666.
Office Action dated Apr. 30, 2009 issued in U.S. Appl. No. 11/579,603.
Office Action dated Aug. 31, 2010 issued in U.S. Appl. No. 11/883,929.
Office Action dated May 31, 2011 issued in U.S. Appl. No. 12/805,685.
Office Action dated Apr. 4, 2011 issued in U.S. Appl. No. 12/083,238.

(56) References Cited

OTHER PUBLICATIONS

Office Action dated Apr. 4, 2014 issued in U.S. Appl. No. 13/498,780.
Office Action dated Nov. 4, 2010 issued in U.S. Appl. No. 12/805,685.
Office Action dated Sep. 4, 2007 issued in U.S. Appl. No. 11/049,995.
Office Action dated Apr. 5, 2013 issued in U.S. Appl. No. 11/152,195.
Office Action dated Mar. 5, 2013 issued in U.S. Appl. No. 11/693,355.
Office Action dated May 7, 2009 issued in U.S. Appl. No. 11/152,195.
Office Action dated Apr. 8, 2015 issued in European Patent Application No. 10 183 241.8.
Office Action dated Dec. 8, 2011 issued in U.S. Appl. No. 11/883,621.
Office Action dated Jul. 8, 2010 issued in U.S. Appl. No. 11/579,603.
Office Action dated May 8, 2008 issued in U.S. Appl. No. 11/449,666.
Office Action dated May 8, 2013 issued in U.S. Appl. No. 11/723,822.
Office Action dated Feb. 9, 2009 issued in U.S. Appl. No. 10/562,140.
Opposition against European Patent No. EP 1 641 883, affidavit of 10016041 dated Oct. 30, 2014, (further experimental reproductions by Dr. Speyerer), 3 pages.
Partial European Search Report dated May 25, 2007 issued in European Application No. 06026348.0.
Partial European Search Report dated Jun. 11, 2007 issued in European Application No. 07 10 5112.2.
*Particle Size Analysis and Characterization of Classification Process: 6. Classification Methods*, Ullmann's Enc. Ind. Chem., 6th e.d. (2002) Electronic Release.
Pharmco Products Inc., Sodium Hydroxide 50% Product Specification Sheet (2002).
Response to European Office Action issued in related European Patent Application No. EP07005807.8.
S. Kishi, "Handbook of Food Additives Edition 1981", Food and Science Company, pp. 285. (Partial English Translation).
S. Kishi: "Handbook of Food Additives Edition 1983", Food and Science Company, pp. 214, 217, 219, 221. (Partial English Translation).
Saxena (ftp://ftp.fao.org/es/esn/jecfa/cta/CTA_61_PVA.pdf) published 2004.
State Intellectual Property Office of the P.R. China Examination Report dated Jan. 20, 2009.
Statement of Delivery No. 89055427 dated Feb. 10, 1999—with English Translation.
Statement of Delivery No. 89055472 dated Feb. 10, 1999—with English Translation.
Summons to attend oral proceedings dated Jun. 10, 2014 issued in EP Application No. 04773399.3.
Supplementary European Search Report dated Jan. 17, 2014 issued in EP Application No. 10820587.3.
Taiwan Office Action dated Nov. 8, 2011 issued in Taiwanese Application No. 095147238 with English translation.
The Polymer Handbook, 3rd Edition, p. 524 and p. 527-539.
Ulimann's Encyclopedia of Industrial Chemistry (2003, Bd 33:S. 241-242, Bd.8:S. 247-248).
Ulshöfer et al., *Mathematical formula collection for secondary school*, Verlag Konrad Wittwer Stuttgart, 3rd e.d., p. 4, 1988 (with English translation).
www.nichidene.com/Eng/kkh/b/b-2.htm.
Zschimmer & Schwarz (http://www.tandem-chemiscal.com/principles/zschimmer/ceramics_aux/special_info/E_PVAzubereitungen%5B1%5D.pdf) downloaded Dec. 4, 2009.
Dow Chemical Company Limited: Safety Data Sheet, Product name: VERSENEX 80 Chelating Agent, Print Date: Nov. 8, 2016, Version 13.0.
Frank, M. (2012), Superabsorbents, *Ullman's Encyclopedia of Industrial Chemistry*, 35: 214-232 (published online Jan. 15, 2013, DOI: 10.1002/14356007.f25_f01).
Howe-Grant, M. (1992), Kirk-Othmer Encyclopedia of Chemical Technology, *Aluminum Sulfate and Alums*, 4th Edition: 330-335.
Search query in Kanto Chemical Co., Inc. Online Chemical Catalog for "Aluminum Sulfate" at http://cica-web.kanto.cp.jp/CicaWeb/servlet/wsj.front.LogonSvlt?lang=En, Retrieved on Jan. 26, 2018.
Product No. 01186 Specification from Kanto Chemical Co., Inc. for Aluminum Sulfate 14 ~ 18 water in the "extra pure" and "guaranteed reagent" grades, Retrieved on Jan. 26, 2018.

\* cited by examiner

WATER-ABSORBENT RESIN COMPOSITION, METHOD OF MANUFACTURING THE SAME, AND ABSORBENT ARTICLE

TECHNICAL FIELD

The present invention relates to water-absorbent resin compositions, manufacturing methods therefor, and absorbent articles containing a water-absorbent resin composition.

BACKGROUND ART

A water-absorbent resin or a water-absorbent resin composition has been conventionally widely used as a primary component of paper diapers, sanitary napkins, incontinence pads, and other hygienic materials (absorbent articles) for the purpose of absorbing a body fluid (urine, blood, etc.).

The water-absorbent resin composition contains a water-absorbent resin as a primary component. Known examples of the water-absorbent resin composition include: crosslinked products of partially neutralized products of polyacrylic acid, hydrolysates of starch-acrylonitrile graft polymers, neutralized products of starch-acrylic acid graft polymers, saponification products of vinyl acetate-acrylic ester copolymers, crosslinked products of carboxy methyl cellulose, hydrolysates of acrylonitrile copolymers or acrylamide copolymers and crosslinked products of the hydrolysates, crosslinked products of cationic monomers, crosslinked isobutylene-maleic acid copolymers, and crosslinked products of 2-acrylamide-2-methylpropanesulfonic acid and acrylic acid.

Recent paper diapers and like hygienic materials have increasingly high performance and a decreasing thickness. Thickness reduction is attempted while increasing absorption and securing leak prevention by increasing the amount or ratio (mass-equivalent ratio in absorbent article) of the water-absorbent resin composition used.

Hygienic materials containing an increased amount of water-absorbent resin composition in this manner are preferable in view of simply storing more liquid. However, when actually used in a diaper, the water-absorbent resin composition absorbs water, swells, and changes to soft gel in the diaper. This phenomena, or "gel blocking," reduces absorption and causes leakage. This is undesirable.

Accordingly, the liquid permeability of the water-absorbent resin composition has recently attracted a great deal of attention. Some documents, including patents documents 1 to 7 listed below, report a method of raising liquid permeability by crosslinking the surface of the water-absorbent resin with cations of aluminum or a like multivalent metal. Multivalent metal cations are widely used also to modify the water-absorbent resin other than the improvement of liquid permeability: for example, improvement of powder fluidity upon moisture absorption and improvement of mixing property of an aqueous liquid with the water-absorbent resin.

It is known that aluminum sulfate generally contains Fe in an amount of 0.16 to 11.5 mass % to the Al (see, non-patent document 1, for example).

Patent document 1: U.S. Pat. No. 6,620,889, Specification (issued Sep. 16, 2003)
Patent document 2: U.S. Pat. No. 6,605,673, Specification (issued Aug. 12, 2003)
Patent document 3: U.S. Pat. No. 6,863,978, Specification (issued Mar. 8, 2005)
Patent document 4: U.S. Pat. No. 6,323,252, Specification (issued Nov. 27, 2001)
Patent document 5: U.S. Pat. Application 2005/00671 (published Mar. 31, 2005)
Patent document 6: U.S. Pat. No. 4,771,105, Specification (issued Sep. 13, 1988)
Patent document 7: U.S. Pat. No. 4,043,952, Specification (issued Aug. 23, 1977)
Non-patent document 1: EUROPEAN STANDARD, EN 878:2004, page 10 (Table 5), published June 2004.

DISCLOSURE OF INVENTION

The inventors of the present invention, however, have found that the conventional water-absorbent resin composition described above in which the surface of the water-absorbent resin is crosslinked by cations of a multivalent metal, when used in diapers and other absorbent articles, does not show desirable liquid permeability, and worse still causes unwanted coloring.

It has been known that multivalent metal cations can be used to modify a water-absorbent resin composition. In contrast, it is not known that the water-absorbent resin composition containing multivalent metal cations suffers from decreasing liquid permeability over time (especially when used to absorb urine) and coloring (especially progressive coloring over time).

The water-absorbent resin composition which has liquid permeability improved by the use of multivalent metal cations is usually used in high concentration (high weight) in diapers and like absorbent articles. The coloring of the water-absorbent resin composition used in large amounts leads to coloring of the absorbent article and lowers the commercial value of the absorbent article.

If the water-absorbent resin composition colors after converting (for example, after the manufacture of the diaper), the coloring occurs during the distribution or after the sale of the absorbent article. The coloring of the absorbent article may not be found until a consumer is about to use it. The consumer would make a complaint to the manufacture, which possibly undesirably damages the consumer's trust in the commercial good and the good's reputation in the market.

In view of the problems mentioned above, it is an objective of the present invention to provide a water-absorbent resin composition suitable for use in diapers and like absorbent articles, as well as for other practical purposes. More specifically, the objective is to provide a water-absorbent resin composition suitable for use in diapers and like absorbent articles, as well as for other practical purposes, which shows little decrease in liquid permeability over time or in relation to another factor and limited coloring (especially, over time).

The inventors have diligently worked to solve the problems and found during the course that the water-absorbent resin composition fails to show sufficient liquid permeability when the composition is used in diapers or other urine-absorbent articles. The inventors have found that since the water-absorbent resin composition shows improved liquid permeability for physiological saline and other substances which are used to evaluate the liquid permeability, the cause of the problems is the water-absorbent resin composition changing over time or in relation to another factor in actual use of the absorbent article in such an environment that the composition contacts urine and that these time-related changes lower the liquid permeability of the water-absorbent resin composition.

Specifically, the water-absorbent resin composition containing a water-absorbent resin of which the surface is crosslinked by multivalent metal cations shows improved liquid permeability when manufactured. The composition, however, shows poor liquid permeability after an extended period of use (for example, 16 hours), especially in an environment where the composition is in contact with urine because the polymer chain of the water-absorbent resin breaks or otherwise changes over time or in relation to another factor. Thinking of the time a diaper is worn (for example, throughout the night), the decrease in liquid permeability during that period is very undesirable. For the above reasons, the water-absorbent resin composition containing a water-absorbent resin of which the surface is crosslinked by multivalent metal cations, in some cases, shows poorer liquid permeability after some time than the water-absorbent resin composition containing a water-absorbent resin of which the surface is not crosslinked.

The inventors have found another problem: the water-absorbent resin composition colors (turns to yellow) even if the surface of the water-absorbent resin is crosslinked by colorless, transparent multivalent metal cations. The coloring is barely appreciable at the time of manufacture of the water-absorbent resin composition. The coloring of the water-absorbent resin composition progresses, however, with time during storage or after converting (for example, after the composition is fabricated into a diaper) after the composition is manufactured.

In an effort to solve the phenomena (the decrease in liquid permeability and coloring of the water-absorbent resin composition), the inventors have found that the phenomena become more distinct with an increasing amount of multivalent metal cations used. The inventors have further found that a specific impurity (Fe cations) in the multivalent metal cations and impurities, such as methoxyphenols and furfural, in acrylic acid induce the phenomena and that the problems are solved by controlling the specific impurity (Fe cations) in the multivalent metal cations within a critical range (ordinary multivalent metal cations available on the market contain 200 to 50,000 ppm Fe cations to the multivalent metal cations), controlling the impurities, such as methoxyphenols and furfural, in acrylic acid within a particular range, or adding a metal chelating agent to the water-absorbent resin composition, which has led to the completion of the invention. Especially, the inventors have identified the impurities that affect the phenomena regarding water-absorbent resin compositions obtained by aqueous polymerization and found the content ratio for the impurities at which the impurities greatly suppress the phenomena.

To achieve the objective, a water-absorbent resin composition in accordance with the present invention is characterized in that the composition contains: a polycarboxylate-based water-absorbent resin as a primary component, the resin having a crosslinked structure formed by polymerization of an acid group-containing unsaturated monomer; and multivalent metal cations, wherein: the multivalent metal cations other than Fe cations account for 0.001 to 1 mass % of the water-absorbent resin; and the ratio of the Fe cations to the multivalent metal cations other than the Fe cations is less than or equal to 5.00 mass %.

Another water-absorbent resin composition in accordance with the present invention is characterized in that the composition comprises: a polycarboxylate-based water-absorbent resin as a primary component, the resin having a crosslinked structure formed by polymerization of an acid group-containing unsaturated monomer; and multivalent metal cations, wherein: the multivalent metal cations other than Fe cations account for 0.001 to 1 mass % of the water-absorbent resin; and the ratio of the Fe cations to the water-absorbent resin is not more than 1 ppm (preferably not more than 0.1 ppm).

The water-absorbent resin composition not only shows high liquid permeability for physiological saline, etc., but also shows high liquid permeability in actual use when used in, for example, absorbent articles and shows limited reduction in the liquid permeability over time. That permeability has attracted no attention at all at the time of manufacture of the water-absorbent resin composition. In addition, the water-absorbent resin composition shows limited Fe cation-caused coloring, especially over time. The composition colors less during distribution and after sale. That coloring over time has attracted no attention at the time of manufacture of the water-absorbent resin composition. Thus, the invention provides a water-absorbent resin composition which shows only small reduction in liquid permeability over time or in relation to another factor and limited coloring (especially, over time) and which is suitable for use in diapers and like absorbent articles, as well as for other practical purposes.

To achieve the objective, another water-absorbent resin composition in accordance with the present invention is characterized in that the composition contains: a polycarboxylate-based water-absorbent resin as a primary component, the resin having a crosslinked structure formed by polymerization of an acid group-containing unsaturated monomer; multivalent metal cations; and a chelating agent, wherein: the multivalent metal cations other than Fe cations account for 0.001 to 1 mass % of the water-absorbent resin; and the ratio of the Fe cations to the multivalent metal cations other than the Fe cations is less than or equal to 50 mass %.

Another water-absorbent resin composition in accordance with the present invention is characterized in that the composition comprises: a polycarboxylate-based water-absorbent resin as a primary component, the resin having a crosslinked structure formed by polymerization of an acid group-containing unsaturated monomer; multivalent metal cations; and a chelating agent, wherein: the multivalent metal cations other than Fe cations account for 0.001 to 1 mass % of the water-absorbent resin; and the ratio of the Fe cations to the water-absorbent resin is not more than 1 ppm (preferably not more than 0.1 ppm).

The water-absorbent resin composition contains a chelating agent and a small amount of Fe cations. The water-absorbent resin composition not only shows high liquid permeability for physiological saline, etc., but also shows high liquid permeability in actual use when used in, for example, absorbent articles and shows limited reduction in the liquid permeability over time. That reduction has attracted no attention at all at the time of manufacture of the water-absorbent resin composition. In addition, the water-absorbent resin composition shows limited Fe cation-caused coloring, especially, over time. The water-absorbent resin composition and absorbent article color less during distribution and after sale. That coloring over time has attracted no attention at the time of manufacture of the water-absorbent resin composition. Thus, the invention provides a water-absorbent resin composition which shows only small reduction in liquid permeability over time or in relation to another factor and limited coloring (especially, over time) and which is suitable for use in diapers and like absorbent articles, as well as for other practical purposes.

To achieve the objective, a method of manufacturing a water-absorbent resin composition in accordance with the present invention is characterized in that the method involves the steps of: (a) polymerizing an acid group-containing unsaturated monomer into a polycarboxylate-based water-absorbent resin with a crosslinked structure, the monomer primarily including an acrylic acid and/or a salt thereof as primary components; and (b) adding multivalent metal cations to the water-absorbent resin in 0.001 to 5 mass % to the water-absorbent resin, the ratio of the Fe cations to the multivalent metal cations other than the Fe cations being less than or equal to 0.50 mass %.

The method enables the manufacture of a water-absorbent resin composition which not only shows high liquid permeability for physiological saline, etc., but also shows high liquid permeability in actual use when used in, for example, absorbent articles and shows limited reduction in the liquid permeability over time. That reduction has attracted no attention at all at the time of manufacture of the water-absorbent resin composition. Therefore, the method enables the manufacture of a water-absorbent resin composition which shows only small reduction in liquid permeability over time or in relation to another factor and which is suitable for use in diapers and like absorbent articles, as well as for other practical purposes.

To achieve the objective, an absorbent article in accordance with the present invention is characterized in that the article is at least one absorbent article selected from the group consisting of a paper diaper, a sanitary napkin, and an incontinence pad and contains a water-absorbent resin composition in accordance with the present invention.

The article contains a water-absorbent resin composition in accordance with the present invention. Thus, the invention provides an absorbent article which shows only small reduction in liquid permeability over time or in relation to another factor and limited coloring (especially, over time).

Additional objects, advantages and novel features of the invention will be set forth in part in the description which follows, and in part will become apparent to those skilled in the art upon examination of the following or may be learned by practice of the invention.

BEST MODE FOR CARRYING OUT INVENTION

Figure 1:
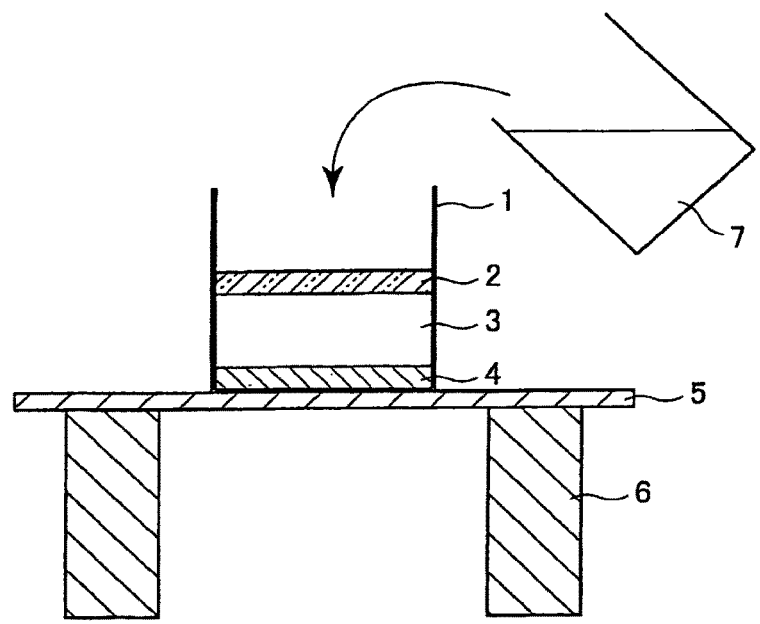
FIG. 1 is a cross-sectional view schematically illustrating the arrangement of a device which measures the degraded liquid permeation rate of a water-absorbent resin composition.

The following will describe embodiments of the present invention in detail. The description is by no means binding on the scope of the present invention. The invention can be modified in suitable manners and carried out in other ways than the examples below within the spirit of the invention.

Throughout the following description, "weight" is a synonym of "mass," "wt %" of "mass %," and "primary component" of "accounting for more than or equal to 50 mass % of the total." The expression for a numerical range, "A to B," refers to the range not less than A and not more than B.

Decimal 0s in mass % (wt %) are omitted unless otherwise stated. Each mass % value however contains significant digits down to the ppm units: for example, "1 mass %" is a synonym for "10,000 ppm" (0s in "1.0000 mass %" are omitted). Also, the unit, "ppm," indicates a mass-equivalent value unless otherwise stated. For example, 10000 ppm means 1 mass %.

A first water-absorbent resin composition in accordance with the present embodiment is a water-absorbent resin composition containing a polycarboxylate-based water-absorbent resin as a primary component, the resin having a crosslinked structure formed by polymerization of an acid group-containing unsaturated monomer; and multivalent metal cations, wherein: the multivalent metal cations other than Fe cations account for 0.001 to 1 mass % of the water-absorbent resin; and the ratio of the Fe cations to the multivalent metal cations other than the Fe cations is less than or equal to 5 mass % (50,000 ppm).

A second water-absorbent resin composition in accordance with the present embodiment is a water-absorbent resin composition containing a polycarboxylate-based water-absorbent resin as a primary component, the resin having a crosslinked structure formed by polymerization of an acid group-containing unsaturated monomer; multivalent metal cations; and a chelating agent, wherein: the multivalent metal cations other than Fe cations account for 0.001 to 1 mass % of the water-absorbent resin; and the ratio of the Fe cations to the multivalent metal cations other than the Fe cations is less than or equal to 50 mass % (500,000 ppm).

(1) Water-Absorbent Resin

The water-absorbent resin is a water-swellable, water-insoluble crosslinked polymer which forms hydrogel upon swelling. A water-swellable crosslinked polymer is, for example, a crosslinked polymer which absorbs at least 5 times, preferably, 50 to 1,000 times, as much water as its weight in ion exchange water. A water-insoluble crosslinked polymer is, for example, a crosslinked polymer containing uncrosslinked water soluble components (water-soluble polymer) in an amount of, preferably 0 to 50 mass %, more preferably less than or equal to 25 mass %, even more preferably less than or equal to 20 mass %, still more preferably less than or equal to 15 mass %, yet more preferably less than or equal to 10 mass % to the water-absorbent resin. Measurement methods for these values will be given in examples of the invention detailed later.

The water-absorbent resin is preferably a water-absorbent resin having a crosslinked structure formed by polymerization of an acid group-containing unsaturated monomer (hereinafter, "monomer"), more preferably a polycarboxylate-based water-absorbent resin having a crosslinked structure, in view of liquid permeability and liquid absorption properties. A polycarboxylate-based water-absorbent resin is a water-absorbent resin having a carboxy group in its main chain as a repeat unit.

Specific examples of the water-absorbent resin include polymers of partially neutralized products of polyacrylic acid, hydrolysates of starch-acrylonitrile graft polymers, starch-acrylic acid graft polymers, saponification products of vinyl acetate-acrylic ester copolymers, hydrolysates of acrylonitrile copolymers and acrylamide copolymers, crosslinked products of these substances, denatured products of carboxyl group-containing crosslinked polyvinyl alcohol, crosslinked isobutylene-maleic anhydride copolymers, and mixtures of any of these substances. The water-absorbent resin is preferably a polymer of a partially neutralized product of polyacrylic acid obtained by polymerization and crosslinking of a monomer containing an acrylic acid and/or a salt (neutralized product) thereof as primary components.

The acid group-containing unsaturated monomer ("monomer") may be acrylonitrile or another monomer which produces acid groups in hydrolysis after polymerization.

The monomer is preferably an acid group-containing unsaturated monomer containing acid groups at the time of polymerization. Preferred examples of the acid group-containing unsaturated monomer containing acid groups at the time of polymerization are unsaturated monomers containing an acrylic acid and/or a salt thereof as a primary component. In the present embodiment, an unpolymerizable organic compound is preferably contained in, or added to, the acrylic acid used to prepare the monomer in advance. Specifically, it is preferable to dissolve an unpolymerizable organic compound in an unneutralized acrylic acid before preparing an aqueous solution of a monomer using the unneutralized acrylic acid.

The unpolymerizable organic compound is an organic compound having no polymerizable unsaturated bond formed with a vinyl group, an allyl group, or the like. The present embodiment may use a 1 to 1000 ppm by weight, wherein the unpolymerizable organic compound has a solubility parameter of $(1.0 \text{ to } 2.5) \times 10^4 \text{ (Jm}^{-3})^{1/2}$.

The solubility parameter ($\delta$) is herein a cohesive energy density and can be calculated from the following equation:

$$\delta((Jm^{-3})^{1/2}) = \rho \Sigma G/M \quad \text{(Equation 1)}$$

where $\rho$ is density (g/cm³), G is the Holly cohesive energy constant, $\Sigma G$ is a sum of cohesive energy constants of component atom groups, $\rho$ and G are values at a temperature of 25±1°C., and M is molecular weight.

Herein, if the solubility parameter $\delta$ is calculated in the unit $((calm^{-3})^{1/2})$, the solubility parameter is appropriately expressed in the unit $(Jm^{-3})^{1/2}$.

For example, the value $\delta$ of solubility parameter specified in the publications such as The Polymer Handbook, 3rd Edition (pages 527 to 539; published by Wiley Interscience Publication) and Chemical handbook Basic Edition (published by the Chemical Society of Japan) is adopted. Also, as the solubility parameter of a solvent, which is not specified on the publications, the value $\delta$ which is obtained by substituting the Holly cohesive energy constant into the Small equation specified on page 524 of The Polymer Handbook is adopted.

The present embodiment uses the monomer including the above particular compound in certain amounts, thereby producing, with a high productivity, a water-absorbent resin having (i) an improved relationship between absorption capacity and water-soluble polymer, which are conflicting properties of the water-absorbent resin, (ii) being easily controlled for polymerization reaction, (iii) being less colored, and (iv) being of high absorption properties. A monomer having an unpolymerizable organic compound content of less than 1 ppm by weight, wherein the unpolymerizable organic compound has a solubility parameter of $(1.0 \text{ to } 2.5) \times 10^4 \text{ (Jm}^{-3})^{1/2}$, is not preferred because it has the difficulty in being controlled for polymerization, which is caused by an excessive rise in temperature of a polymerized substance due to heat liberated by the polymerization, and causes degradation in absorption properties. Meanwhile, a monomer having an unpolymerizable organic compound content of more than 1000 ppm by weight, wherein the unpolymerizable organic compound has a solubility parameter of $(1.0 \text{ to } 2.5) \times 10^4 \text{ (Jm}^{-3})^{1/2}$, includes too much amount of the unpolymerizable organic compound to achieve the object of the present invention, and might cause the problem, e.g. odor from a resultant water-absorbent resin.

Further, the particular compound (unpolymerizable organic compound) is finally removed by a particular heating step (e.g. drying and surface treatment) so that the resultant water-absorbent resin is free from odors and other problems.

Such an unpolymerizable organic compound is used preferably in an amount of 1 to 1000 ppm by weight, more preferably 1 to 500 ppm by weight, even more preferably 1 to 300 ppm by weight, still more preferably 5 to 300 ppm by weight, yet more preferably, 10 to 300 ppm by weight, most preferably 10 to 100 ppm by weight, relative to the monomer (or the monomer composition which will be detailed later).

The solubility parameter of the unpolymerizable organic compound is essentially $(1.0 \text{ to } 2.5) \times 10^4 \text{ (Jm}^{-3})^{1/2}$, preferably $(1.0 \text{ to } 2.2) \times 10^4 \text{ (Jm}^{-3})^{1/2}$, more preferably $(1.1 \text{ to } 2.0) \times 10^4 \text{ (Jm}^{-3})^{1/2}$, still more preferably $1.3 \text{ to } 2.0) \times 10^4 \text{ (Jm}^{-3})^{1/2}$, and most preferably $(1.5 \text{ to } 1.9) \times 10^4 \text{ (Jm}^{-3})^{1/2}$.

The organic compound having a solubility parameter of $(1.0 \text{ to } 2.5) \times 10^4 \text{ (Jm}^{-3})^{1/2}$, which is an organic compound having an excellent compatibility with acrylic acid and having no polymerizable unsaturated bonds, refers to a lipophilic organic compound. Of such unpolymerizable organic compounds, an organic compound having no halogen content is preferable, and hydrocarbon consisting of only carbon and hydrogen is more preferable, in terms of environmental loads. Further, a boiling point of the unpolymerizable organic compound is preferably 95 to 300°C., more preferably 130 to 260°C. The organic compound having a solubility parameter of more than $2.5 \times 10^4 \text{ (Jm}^{-3})^{1/2}$ is not preferable in terms of polymerization control and polymerization reaction.

More specifically, the unpolymerizable organic compound is at least one compound selected from the group consisting of heptane (boiling point: 95°C.), dimethyl cyclohexane (boiling point: 132°C.), ethyl cyclohexane, toluene (boiling point: 110°C.), ethyl benzene (boiling point: 136°C.), xylene (boiling point: 138 to 144°C.), diethyl ketone (boiling point: 101°C.), diisopropyl ketone (boiling point: 124 to 125°C.), methyl propyl ketone (boiling point: 102°C.), methyl isobutyl ketone, methyl-t-butyl ketone, n-propyl acetate (boiling point: 101°C.), n-butyl acetate (boiling point: 124 to 125°C.), diphenyl ether (boiling point: 259°C.), and diphenyl (boiling point: 255°C.).

Of these unpolymerizable organic compounds, preferably is at least one compound selected from the group consisting of heptane, ethyl benzene, xylene, methyl isobutyl ketone, methyl-t-butyl ketone, diphenyl ether, and diphenyl, more preferably hydrophobic compounds, still more preferably aromatic compounds, particularly preferably toluene, diphenyl ether, and diphenyl, most preferably toluene in terms of polymerization properties and productivity and further in terms of the effect of inhibiting oxidation and deterioration of a polymer chain after the completion of the polymerization step.

The unpolymerizable organic compound is more preferably included in the monomer (or the monomer composition which will be detailed later) before polymerization. The monomer including unpolymerizable organic compound may be prepared in such a manner that the unpolymerizable organic compound is added to a monomer (or the monomer composition which will be detailed later) after the preparation of the monomer, the unpolymerizable organic compound is added to a monomer (or the monomer composition which will be detailed later) during the preparation of the monomer, or the unpolymerizable organic compound is included in advance or added to raw materials for a monomer (or the monomer composition which will be detailed later) including acrylic acid, cross-linking agents, water, and alkali compounds. In such preparation methods, the unpolymerizable organic compound is hydrophobic and generally water-insoluble, and therefore is preferably dissolved or included in acrylic acid, in advance. In the present embodiment, it is preferable that the unpolymerizable organic compound is included or added, in advance, to acrylic acid as used in preparing the monomer. That is, it is preferable that the unpolymerizable organic compound is dissolved in advance in an unneutralized acrylic acid so that the unneutralized acrylic acid is used for the preparation of an aqueous solution of the monomer.

The acrylic acid of the present embodiment preferably contains a 10 to 180 ppm methoxyphenol, more preferably 10 to 150 ppm, even more preferably 10 to 90 ppm, still more preferably 10 to 80 ppm, and the most preferably 10 to 70 ppm.

Methoxyphenols are compounds which have a methoxyphenol unit. Specific examples include o-, m-, and p-methoxyphenol with or without at least one substituent, such as a methyl group, a t-butyl group, or a hydorxyl group. In the present embodiment, p-methoxyphenol is especially preferable.

If the methoxyphenol (especially, p-methoxyphenol) accounts for more than 180 ppm, the resultant water-absorbent resin is undesirably colored (becomes yellowish or turns into yellow). If the methoxyphenol accounts for less than 10 ppm (especially, if less than 5 ppm) as a result of removing the methoxyphenol (especially, p-methoxyphenol) from the acrylic acid by, for example, distilling or other refining, there is a risk of the acrylic acid starting polymerization before deliberately doing so. Besides, surprisingly, such low methoxyphenol content could slow down the rate of polymerization of the acrylic acid.

The acrylic acid used in the present embodiment may be p-methoxyphenol or another non-methoxyphenol polymerization inhibiting agent in its manufacturing step. Examples of effective non-methoxyphenol polymerization inhibiting agents include phenothiazine, hydroquinone, copper salt, and methylene blue. These non-methoxyphenol polymerization inhibiting agents, unlike methoxyphenols, disrupt the polymerization of acrylic acid. It is therefore better if the ultimate acrylic acid contains less of the agents. The agents account for preferably 0.1 ppm or less, more preferably 0 ppm (less than or equal to detectable limit) of the acrylic acid.

The acrylic acid used in the present embodiment preferably contains 20 ppm or less furfural. With growing furfural content in the acrylic acid, polymerization time (time taken to reach polymerization peak temperature) becomes longer, hence more monomer remains unreacted, and the resultant water-absorbent resin contains much more soluble (water-soluble) content. To improve the physical properties and characteristics of the water-absorbent resin, the acrylic acid contains more preferably 10 ppm or less furfural, even more preferably 0.01 to 5 ppm, still more preferably 0.05 to 2 ppm, and the most preferably 0.1 to 1 ppm.

When the monomer contains an acrylic acid and/or a salt thereof as primary components, another monomer may be used together. In a case like this, the methoxyphenol content and furfural content described above are determined by the content in a monomer composition containing the other monomer, an acrylic acid, and/or a salt thereof. That is, the monomer composition contains preferably 10 to 180 ppm methoxyphenol and 20 ppm or less furfural.

Examples of the other monomer include water-soluble or hydrophobic unsaturated monomers, such as methacrylic acid, maleic (anhydride) acid, fumaric acid, crotonic acid, itaconic acid, vinyl sulfonic acid, 2-(meth)acrylamide-2-methylpropanesulfonic acid, (meth)acryloxyalkanesulfonic acid and an alkali metal salt thereof, the ammonium salt, N-vinyl-2-pyrrolidone, N-vinyl acetoamide, (meth)acrylamide, N-isopropyl(meth)acrylamide, N,N-dimethyl(meth) acrylamide, 2-hydroxyethyl(meth)acrylate, methoxypolyethylene glycol (meth)acrylate, polyethylene glycol (meth) acrylate, isobutylene, and lauryl (meth)acrylate.

When the monomer contains non-acrylic acid (salt), the non-acrylic acid (salt) monomer is contained in an amount of preferably 0 to 30 mol %, more preferably 0 to 10 mol %, to the sum of the acrylic acid and/or the salt thereof as primary components. The use of a non-acrylic acid (salt) monomer in that amount imparts further improved absorption properties to the final water-absorbent resin (and water-absorbent resin composition) and further reduces the manufacturing cost for the water-absorbent resin (and water-absorbent resin composition).

The water-absorbent resin must have a crosslinked structure. The crosslinked structure of the water-absorbent resin may be formed either by the use of an internal crosslinking agent or automatically without using an internal crosslinking agent. The crosslink is formed preferably by copolymerization or reaction of an internal crosslinking agent containing in each molecule at least two polymerizing unsaturated groups or reactive groups (an internal crosslinking agent for the water-absorbent resin).

Specific examples of the internal crosslinking agent includes N,N'-methylene bis(meth)acrylamide, (poly)ethylene glycol di(meth)acrylate, (poly)propylene glycol di(meth)acrylate, trimethylolpropane tri(meth)acrylate, glycerine tri(meth)acrylate, glycerine acrylate methacrylate, ethylene oxide-denatured trimethylolpropane tri(meth)acrylate, pentaerythritol hexa(meth)acrylate, triallyl cyanurate, triallyl isocyanurate, triallyl phosphate, triallylamine, poly(meth) allyloxyalkane, (poly)ethylene glycol diglycidyl ether, glycerol diglycidyl ether, ethylene glycol, polyethylene glycol, propylene glycol, glycerine, pentaerythritol, ethylenediamine, ethylene carbonate, propylene carbonate, polyethyleneimine, and glycidyl(meth)acrylate.

Any of the internal crosslinking agents may be used alone, or alternatively two or more of them may be used together in any suitable combination. The internal crosslinking agents may be added to the reaction system in single batch or in multiple batches. Considering the absorption and other properties of the final water-absorbent resin and water-absorbent resin composition, it is preferable to unexceptionally use a compound containing multiple polymerizing unsaturated groups in each molecule for polymerization if at least one or two internal crosslinking agents are used.

The internal crosslinking agent is used in preferably 0.001 to 2 mol %, more preferably 0.005 to 1 mol %, even more preferably 0.005 to 0.5 mol %, still more preferably 0.01 to 0.5 mol %, yet more preferably 0.01 to 0.2 mol %, again more preferably 0.03 to 0.2 mol %, and most preferably 0.03 to 0.15 mol %, to the monomer (minus the internal crosslinking agent). If the internal crosslinking agent is used in less than 0.001 mol % or more than 2 mol %, the resultant absorption properties may be insufficient: there may be a large amount of water-soluble component or the water absorbency may be too low.

To introduce a crosslinked structure inside the polymer using the internal crosslinking agent, the internal crosslinking agent may be added to the reaction system, for example, before, during, or after the polymerization of the monomer. Alternatively, the agent may be added after neutralization.

The addition of the internal crosslinking agent "during" the polymerization means both intermittent addition in at least one period during the polymerization of the monomer into the water-absorbent resin and continuous addition throughout the polymerization.

The polymerization of the monomer for the purpose of producing the water-absorbent resin of the present embodiment may be bulk polymerization or precipitation polymerization. However, aqueous polymerization or reverse phase suspension polymerization, in both of which the monomer is used in the form of aqueous solution, is preferred in view of performance, easy controllability of polymerization, and the absorption properties of swollen gel. The water-absorbent resin obtained by aqueous polymerization is likely to become colored than the water-absorbent resin obtained by reverse phase suspension polymerization. Effects of the present invention are move evident when aqueous polymerization is employed.

When the monomer is used in the form of aqueous solution, the concentration of the monomer in the aqueous solution (hereinafter, "aqueous solution of monomer") is not limited in any particular manner and may be determined depending on the temperature of the aqueous solution, the type of the monomer, and/or other factors. The concentration is preferably from 10 to 70 mass %, more preferably from 20 to 60 mass %. In the polymerization of the aqueous solution, a solvent(s) other than water may be used together where necessary. The type of solvent used together is not limited in any particular manner.

In reverse phase suspension polymerization, the aqueous solution of monomer is suspended in a hydrophobic organic solvent. The method is described in U.S. patents, such as U.S. Pat. No. 4,093,776, Specification; U.S. Pat. No. 4,367,323, Specification; U.S. Pat. No. 4,446,261, Specification; U.S. Pat. No. 4,683,274, Specification; and U.S. Pat. No. 5,244,735, Specification. In aqueous polymerization, no dispersion solvent is used in the polymerization of the aqueous solution of monomer. The method is described in U.S. patents, such as U.S. Pat. No. 4,625,001, Specification; U.S. Pat. No. 4,873,299, Specification; U.S. Pat. No. 4,286,082, Specification; U.S. Pat. No. 4,973,632, Specification; U.S. Pat. No. 4,985,518, Specification; U.S. Pat. No. 5,124,416, Specification; U.S. Pat. No. 5,250,640, Specification; U.S. Pat. No. 5,264,495, Specification; U.S. Pat. No. 5,145,906, Specification; U.S. Pat. No. 5,380,808, Specification; U.S. Pat. No. 6,174,978, Specification; U.S. Pat. No. 6,194,531, Specification; U.S. Pat. No. 6,207,772, Specification; and U.S. Pat. No. 6,241,928, Specification. In the present embodiment, the monomers, initiators, etc. given as examples in these U.S. patents which describe reverse phase suspension polymerization and aqueous polymerization can also be used.

To initiate the polymerization, a radical polymerization initiator and/or an optical polymerization initiator may be used. Examples of the former include potassium persulfate, ammonium persulfate, sodium persulfate, t-butylhydroperoxide, hydrogen peroxide, and 2,2'-azobis(2-amidino propane) dihydrochloride. An example of the latter is 2-hydroxy-2-methyl-1-phenyl-propane-1-one. Considering the physical properties of the water-absorbent resin after the polymerization, these polymerization initiators is typically used in 0.001 to 2 mol %, preferably, 0.01 to 0.1 mol % (to the whole monomer).

After the polymerization, the polymer is usually a crosslinked polymer in the form of water-containing gel. The polymer is dried and pulverized in an ordinary manner before and/or after the drying as required to obtain the water-absorbent resin. Typically, the drying is done at 60 to 250°C., preferably at 100 to 220°C., more preferably at 120 to 200°C. The drying time depends on the surface area of the polymer, its water content ratio (determined in terms of the water content of the water-absorbent resin and the water-absorbent resin composition and measured as reduction in weight before and after drying at 105°C. for 3 hours), and the type of the drier. The drying time is set so as to achieve a target water content ratio. Centrifuge retention capacity (CRC) after the drying can be controlled to 20 g/g or greater, preferably 30 to 60 g/g, by tailoring polymerization conditions for water-absorbent resin, such as conditions for internal crosslinking, or drying temperature.

The water-absorbent resin of the present embodiment is preferably of a particulate shape. The water-absorbent resin is not limited in any particular manner in terms of particle size, for example, mass-average particle diameter (D50), because the size can be adjusted by classification or another method after the water-absorbent resin composition is formed. The mass-average particle diameter (D50) is however preferably from 250 to 600 μm, more preferably from 350 to 550 μm, even more preferably from 400 to 500 μm, because the diameter in these ranges requires less labor after the formation of the water-absorbent resin composition. Particles with particle diameters from 150 to 850 μm as obtained with a standard sieve preferably account for 90 to 100 mass %, more preferably 95 to 100 mass %, and even more preferably 99 to 100 mass % of the whole water-absorbent resin.

If reverse phase suspension polymerization is employed in manufacture, the polymer in particulate form may be subjected to dispersion polymerization and dispersion drying to adjust the particle sizes of the water-absorbent resin to achieve the range.

If aqueous polymerization is employed, pulverization and classification may be carried out following the drying to adjust the particle sizes. In the pulverization and classification, the mass-average particle diameter D50 and the rate of particles with diameters less than 150 μm, which are tradeoff conditions, are balanced to achieve a particular particle size distribution. For example, to reduce fine particles (<150 μm) while maintaining the mass-average particle diameter D50 as low as 600 μm or less, large particles and fine particles may be removed using a sieve or other common classification device after the pulverization if necessary. The large particles removed here are preferably those with diameters from 850 μm to 5,000 μm, more preferably from 850 μm to 2,000 μm, even more preferably from 850 μm to 1,000 μm. The fine particles removed in the particle size regulation are preferably those with diameters less than 200 μm, more preferably less than 150 μm.

The large particles removed could be discarded. Generally, however, they are recycled and brought back to another pulverization step for pulverization. The fine particles removed could be discarded. Aggregation of the fine particles (detailed later) however can reduce a fall in yield ratio.

The water-absorbent resin prepared by the pulverization step for particular particle size distribution has an irregularly pulverized shape.

The fine particles removed in pulverization, classification, or another particle size control step may be recycled to produce large particles or a particulate aggregate for use as the water-absorbent resin of the present embodiment. The fine particles can be recycled to produce large particles or a particulate aggregate by the methods described in, for example, U.S. Pat. Nos. 6,228,930, 5,264,495, 4,950,692, 5,478,879, and EP Pat. 844,270. According to the methods, fine particles and an aqueous liquid, isolated from each other, are brought into contact with each other under particular conditions to improve viscosity so that the particles can aggregate. The water-absorbent resin recovered in this manner practically has a porous structure.

The water-absorbent resin recovered from the large and fine particles accounts for preferably 0 to 50 mass %, more preferably 5 to 40 mass %, and most preferably 10 to 30 mass % of the water-absorbent resin of the present embodiment.

When the fine particles in the recovered water-absorbent resin are used as the water-absorbent resin in accordance with the present invention, those fine particles have a greater surface area than primary particles of the same particle diameters. Water is quickly absorbed. Thus, they are better in performance. As explained here, the water-absorbent resin recovered through aggregation of fine particles are typically mixed with the water-absorbent resin obtained in the drying step before pulverization, classification, and particle size control.

In the present embodiment, "particles less than 150 μm" refers to particles which have passed through a JIS-standard sieve (JIS Z8801-1 (2000)) or its equivalent which has 150 μm openings (equal to the size to be measured) after classification using a sieve(s) as will be detailed later. "Particles more than or equal to 150 μm"refers similarly to particles which have not passed through, and have remained on, a JIS-standard sieve which has 150 μm openings (equal to the size to be measured) after classification as will be detailed later. The same applies to openings of other sizes. Classification of 50 mass/n % of particles with a mesh having 150 μm openings provides a mass-average particle diameter (D50) of 150 μm.

The water-absorbent resin in the water-absorbent resin composition in accordance with the present invention, which are polymerized through crosslinking and dried as above, may be crosslinked further at the surface (secondary crosslinking) for a modified, polymerized water-absorbent resin with improved physical properties.

Various surface crosslinking agents are available for the surface crosslinking. Usually, one or two of the following compounds is used in consideration of physical properties: an oxazoline compound (U.S. Pat. No. 6,297,319), a vinyl ether compound (U.S. Pat. No. 6,372,852), an epoxy compound (U.S. Pat. No. 6,254,990), an oxetane compound (U.S. Pat. No. 6,809,158), a multivalent alcohol compound (U.S. Pat. No. 4,734,478), a polyamide polyamine-epihalo adduct (U.S. Pat. No. 4,755,562 and U.S. Pat. No. 4,824,901), a hydroxy acrylamide compound (U.S. Pat. No. 6,239,230), an oxazolidinone compound (U.S. Pat. No. 6,559,239), a bis- or poly-oxazolidinone compound (U.S. Pat. No. 6,472,478), a 2-oxotetrahydro-1,3-oxazolidine compound (U.S. Pat. No. 6,657,015), and an alkylene carbonate compound (U.S. Pat. No. 5,672,633). An alkali (U.S. Pat. 2004/106745) or an organic acid/inorganic acid (U.S. Pat. No. 5,610,208) may be used together with the surface crosslinking agent(s). The monomer may be polymerized at the surface of the water-absorbent resin for surface crosslinking (U.S. Pat. 2005/48221).

Specific examples of the surface crosslinking agent include multivalent alcohol compounds, such as mono, di, tri, tetra, or polyethylene glycol, 1,2-propylene glycol, 1,3-propanediol, dipropylene glycol, 2,3,4-trimethyl-1,3-pentanediol, polypropylene glycol, glycerine, polyglycerine, 2-butene-1,4-diol, 1,4-butanediol, 1,3-butanediol, 1,5-pentanediol, 1,6-hexanediol, and 1,2-cyclohexane dimethanol; epoxy compounds, such as ethylene glycol diglycidyl ether and glycidol; multivalent amine compounds, such as ethylenediamine, diethylenetriamine, triethylenetetramine, tetraethylenepentamine, pentaethylenehexamine, polyethyleneimine, and polyamide polyamine; haloepoxy compounds, such as epichlorohydrin, epibromohydrin, and α-methyl epichlorohydrin; condensates of the multivalent amine compounds and the haloepoxy compounds; oxazolidinone compounds, such as 2-oxazolidinone; oxetane compounds; cyclic urea compounds; and alkylene carbonate compounds (U.S. Pat. No. 5,409,771), such as ethylene carbonate. The surface crosslinking agents are however not limited in any particular manner. To further improve the liquid absorption properties of the water-absorbent resin, among these surface crosslinking agents, it is preferable to use at least one compound selected from the group consisting of at least oxetane compounds, cyclic urea compounds, and multivalent alcohols, more preferably at least one selected from the group consisting of oxetane compounds containing 2 to 10 carbons and multivalent alcohols, even more preferably a multivalent alcohol having 3 to 8 carbons.

The surface crosslinking agent, although depending on the compound(s) used and their combination, may be used in preferably 0.001 mass parts to 10 mass parts, more preferably 0.01 mass parts to 5 mass parts, to 100 mass parts of the water-absorbent resin.

Water may be used for the surface crosslinking too. The water, although depending on the water content ratio of the water-absorbent resin used, may be normally used in preferably 0.5 to 20 mass parts, more preferably 0.5 to 10 mass parts, to 100 mass parts of the water-absorbent resin. A hydrophilic organic solvent other than water may be used. The solvent may be used in preferably 0 to 10 mass parts, more preferably 0 to 5 mass parts, even more preferably 0 to 3 mass parts, to 100 mass parts of the water-absorbent resin.

Preferably, the surface crosslinking agent is mixed with the water-absorbent resin as follows. Water and/or a hydrophilic organic solvent are mixed with the surface crosslinking agent in advance if necessary. Thereafter, the aqueous solution is sprayed or applied dropwise to the water-absorbent resin (spraying is more desirable). The spray drops measure preferably 1 to 300 μm, more preferably 10 to 200 μm, in average particle diameter. When mixing, water-insoluble fine particles, a surfactant, etc. may be present so long as their presence does not adversely affect effects of the present invention.

The step of surface crosslinking the water-absorbent resin may be carried out either during or after a step of adding multivalent metal cations to the water-absorbent resin (detailed later).

The water-absorbent resin mixed with the surface crosslinking agent is preferably thermally processed. The process is carried out, preferably, under the following conditions. Heating temperature (as specified as the temperature of thermal medium) is preferably 100 to 250°C., more preferably 150 to 250°C. Heating period is preferably from 1 minute to 2 hours. Suitable temperature/period combination examples are 0.1 to 1.5 hours at 180°C. and 0.1 to 1 hour at 200°C.

The physical properties (centrifuge retention capacity (CRC), absorbency against pressure (AAP), saline flow conductivity (SFC), which will be detailed later) of the water-absorbent resin composition are controllable through the control of the surface crosslink conditions and particle size of the water-absorbent resin. Specifically, the values of AAP, SFC, etc. (detailed later) can be controlled to fall in a preferred range by reducing the CRC of the water-absorbent resin after the surface crosslinking to 0.50 to 0.95 times, preferably 0.60 to 0.90 times, and more preferably 0.70 to 0.85 times that of the water-absorbent resin before the surface crosslinking.

(2) Multivalent Metal Cations

The water-absorbent resin composition of the present embodiment contains multivalent metal cations.

The inclusion of multivalent metal cations provides further improved liquid permeability when fabricated into a water-absorbent resin composition. The multivalent metal cations inside the water-absorbent resin composition particles make no contribution to liquid permeability. It is therefore preferable to attach multivalent metal cations to the surface of the water-absorbent resin composition particles. Multivalent metal cations attach to the surface of the water-absorbent resin composition particles if multivalent metal cations are added to dried powder of the water-absorbent resin.

Specifically, a method of manufacturing a water-absorbent resin composition of the present embodiment involves the steps of: polymerizing an acid group-containing unsaturated monomer into a polycarboxylate-based water-absorbent resin with a crosslinked structure, the monomer including an acrylic acid and/or a salt thereof as primary components; and adding multivalent metal cations to the water-absorbent resin in 0.001 to 5 mass % to the water-absorbent resin, the ratio of Fe cations to the multivalent metal cations other than the Fe cations being less than or equal to 0.50 mass %.

The multivalent metal providing the multivalent metal cations is by no means limited in any particular manner. A preferred example of the metal is at least one kind of metal atoms selected from the group consisting of Al, Ti, Hf, Zr, and other miscellaneous transition metals. A particularly preferred example among them is at least one kind of metal atoms selected from the group consisting of Al, Ti, Hf, and Zr, which have strong bonds with carboxyl groups. Al, Zr are further preferred among them.

In the water-absorbent resin composition in accordance with the present invention, the multivalent metal cations other than Fe cations account for 0.001 to 5 mass %, preferably 0.001 to 3 mass %, more preferably 0.01 to 3 mass %, still more preferably 0.03 to 3 mass %, yet more preferably 0.04 to 3 mass %, even more preferably 0.1 to 3 mass %, yet more preferably 0.3 to 2.5 mass %, and most preferably 0.5 to 2 mass %, of the water-absorbent resin. If the multivalent metal cations other than Fe cations account for more than 5 mass % of the water-absorbent resin, the water-absorption ratio of the water-absorbent resin composition may drop. If they account for less than 0.001 mass %, sufficient liquid permeability cannot be imparted to the water-absorbent resin composition. Both cases are undesirable. Multivalent metal cations containing such a small amount of Fe cations can be prepared by removing Fe cations with an ion adsorbing agent or by another suitably selected refining method. If the refining method does not achieve sufficient effect, the method may be repeated until the multivalent metal cations contain a small amount of Fe cations.

In the water-absorbent resin composition in accordance with the present invention, the ratio of the Fe cations to the multivalent metal cations other than the Fe cations is 0 to 0.50 mass %, preferably 1 ppm to 0.30 mass %, even more preferably 10 ppm to 0.20 mass %. If the Fe cations is in an amount in excess of 0.5 mass % to the multivalent metal cations other than the Fe cations, the Fe cations are likely to react with the water-absorbent resin in the water-absorbent resin composition, which will cause following undesirable phenomena. Degradation of the water-absorbent resin, such as breakoffs in the polymer chain, are likely to occur over time or in relation to another factor. In addition, the water-absorbent resin or the water-absorbent resin composition colors more often.

For similar reasons, the Fe cations account for preferably 0 to 100 ppm, more preferably 0 to 50 ppm (or 0.01 to 50 ppm), even more preferably 0 to 20 ppm (or 0.01 to 20 ppm), still more preferably 0 to 10 ppm, yet more preferably 0 to 5 ppm, even more preferably 0 to 1 ppm, still more preferably 0 to 0.5 ppm, yet more preferably 0 to 0.1 ppm, further preferably 0 to 0.01 ppm, and the most preferably less than or equal to detectable limit, to the water-absorbent resin (or water-absorbent resin composition). It is preferable if the Fe cations in the water-absorbent resin, as well as those in the multivalent metal cations, are controlled. The Fe cation content in the water-absorbent resin to or below a particular level can be sufficiently restricted by controlling the Fe cation content in the material from which the water-absorbent resin is made (for example, aqueous solution of monomer) and the elution of Fe cations from the manufacturing device (for example, stainless steel surface).

The Fe cation and non-Fe cation contents in the multivalent metal cations can be calculated, for example, from the amount of the multivalent metal cation salt added. The contents can also obtained by extracting multivalent metal cations from the water-absorbent resin composition. Examples of the extraction method include the technique which will be described in examples of the invention later (plasma emission spectrometry (ICP quantification after extraction in water)) and the method described in International application published under the patent cooperation treaty (PCT) 04/113452.

The multivalent metal cations can be any cations if used as a water-soluble compound. The cations are preferably used as at least one kind of compounds selected from the group consisting of: inorganic compounds containing OH—, $CO_3^{2-}$, or $SO_4^{2-}$; organic acid salts, such as acetic acid salt and propionic acid salt; and halides. Preferred examples of such compounds include aluminum sulfate (including hydrates), potassium aluminum sulfate, sodium aluminum sulfate, aluminum hydroxide, an acetylacetone zirconium complex, zirconium acetate, zirconium propionate, sulfate zirconium, zirconium potassium hexafluoride, zirconium sodium hexafluoride, zirconium ammonium carbonate, zirconium potassium carbonate, and zirconium sodium carbonate. Among them, water-soluble compounds are more preferred.

The multivalent metal cations may be added before the surface crosslinking of the water-absorbent resin, simultaneously with the surface crosslinking, or after the surface crosslinking of the water-absorbent resin. Preferably, the cations are added to the water-absorbent resin before or after the surface crosslinking. Especially preferably, the cations are added after the surface crosslinking.

The multivalent metal cations may be added in the form of powder (powder particles) or slurry dispersed in water, an organic solvent, etc. However, the cations are preferably added in the form of solution whose solvent is either water or a mixed solvent (water plus organic solvent). Any organic solvent can be used here. Preferred examples include monovalent alcohols, such as isopropyl alcohol; multivalent alcohols, such as propylene glycol and glycerine; organic acids, such as acetic acid and lactic acid; and organic solvents which mixes well with water, such as acetone and tetrahydrofuran. The solution of the multivalent metal cations may contain metal compounds with a valence number less than 2, such as sodium hydroxide, sodium carbonate, hydrogen sodium carbonate, acetic acid sodium, lactic acid sodium, potassium hydroxide, and lithium hydroxide.

Another trivalent cation or polycation with a greater valence number than 3, as well as the multivalent metal cations, may be used to surface crosslink the water-absorbent resin. An example is polymer polyamine.

Polymer polyamine is an amine compound which contains three or more cationic groups per molecule. The trivalent cation and polycation with a greater valence number than 3 preferably dissolves in water. A substance is said to "dissolve in water"(water soluble) if at least 0.5 g, preferably at least 1 g, of it dissolves in 100 g of water at 25°C., Examples of the trivalent cation and polycation with a greater valence number than 3 include cationic polymers, such as polyethyleneimine, polyallylamine, and polyvinyl amine. The cationic polymer has a weight-average molecular weight of preferably 1,000 to 1,000,000, more preferably 10,000 to 500,000. The cationic polymer is used, for example, in preferably 0 to 10 mass parts, more preferably 0.001 to 8 mass parts, even more preferably 0.01 to 5 mass parts, to 100 mass parts of the water-absorbent resin composition, although the desirable amount varies depending on the combination of the water-absorbent resin and/or the water-absorbent resin composition.

(3) Chelating Agent

The water-absorbent resin composition of the present embodiment preferably further contains a chelating agent. The use of a chelating agent restricts the reaction of the Fe cations with the water-absorbent resin because the chelating agent chelates the Fe cations in the water-absorbent resin composition. That limits the degradation in liquid permeability of the water-absorbent resin composition which occurs over time or in relation to another factor.

The chelating agent may be of any kind so long as it can chelate the Fe cations. An example is an amino carboxylate-based chelating agent.

The amino carboxylate-based chelating agent is preferably amino carboxylate and can be ethylenediamine tetracetic acid, hydroxyethyl ethylenediamine triacetic acid, diethylenetriamine pentacetic acid, triethylene tetramine hexacetic acid, cyclohexane diamino tetracetic acid, methyl glycine diacetic amid, alkali metal salts of these acids, ammonium salts thereof, and amine salts thereof. Especially preferred among them are amino carboxylates selected from diethylenetriamine pentacetic acid, triethylene tetramine hexacetic acid, methyl glycine diacetic amid, and alkali metal salts of these acids.

The Fe cation content in the water-absorbent resin composition containing the chelating agent is less than or equal to 50 mass %, preferably 200 to 5,000 ppm, more preferably 200 to 1,000 ppm, to the multivalent metal cations other than the Fe cations.

The chelating agent may be used in any amount. To efficiently chelate the Fe cations in the water-absorbent resin composition, the chelating agent content is, for example, preferably 1 ppm to 5 mass %, more preferably 10 to 1,000 ppm, even more preferably 20 to 200 ppm, to the water-absorbent resin.

The method of manufacturing a water-absorbent resin composition of the present embodiment preferably further involves the step of adding a chelating agent to the water-absorbent resin or to the water-absorbent resin composition, wherein the step is carried out either in or after (inclusive of "simultaneous") the step of polymerizing into the water-absorbent resin.

The chelating agent may be added to the water-absorbent resin either during or after the step of polymerizing into the water-absorbent resin. Alternatively, the chelating agent may be added simultaneously with the surface crosslinking of the water-absorbent resin or after the surface crosslinking of the water-absorbent resin.

The addition of the water-absorbent resin "during"the polymerization means both intermittent adding in at least one period during the polymerization into the water-absorbent resin and continuous addition of the water-absorbent resin throughout the polymerization.

(4) Water-Absorbent Resin Composition

The water-absorbent resin composition of the present embodiment manufactured by the method of manufacturing described above as an example is a new water-absorbent resin composition (particulate water absorption agent).

The water-absorbent resin composition of the present invention is a water-absorbent resin composition (water absorption agent) which includes: a polycarboxylate-based water-absorbent resin as a primary component, the resin having a crosslinked structure formed by polymerization of an acid group-containing unsaturated monomer; and multivalent metal cations, wherein: the composition is preferably of a particulate shape, that is, a particulate water absorption agent (particulate water-absorbent resin composition). The water-absorbent resin as a primary component must account for at least 50 mass % and less than 100 mass %, preferably at least 70 mass %, more preferably at least 80 mass %, even more preferably at least 90 mass % of the entire mass, Besides the water-absorbent resin, the composition contains non-Fe multivalent metal cations in an amount of preferably 0.001 to 1 mass % to the water-absorbent resin. The water-absorbent resin composition further contains water (detailed later).

The water-absorbent resin composition of the present embodiment, as mentioned earlier, can be manufactured by, for example, adding the multivalent metal cations to the water-absorbent resin. Furthermore, it is preferable if the water-absorbent resin composition (particulate water absorption agent) is specified in terms of the physical properties below to deliver an excellent absorbent article (hygienic material). The physical properties below are controlled so that they fall in a preferred value range, by specifying the multivalent metal cation content and the Fe cation content in the water-absorbent resin composition.

(a) Degraded Liquid Permeation Rate

The water-absorbent resin composition preferably has a degraded liquid permeation rate (will be defined in an example of the invention) greater than 0 seconds and less than or equal to 40 seconds. The degraded liquid permeation rate is an indicator of the liquid permeability of a water-absorbent resin composition which has changed over time. The smaller the value, the higher the liquid permeability. The degraded liquid permeation rate can be made to fall in the above value range by, for example, specifying the particle size of the water-absorbent resin composition, conditions for surface crosslinking, and the Fe cation content and the multivalent metal cation content in the water-absorbent resin composition.

Usually, liquid permeability is measured using physiological saline as the test solution (see, for example, U.S. Pat. No. 6,620,889, Specification; U.S. Pat. No. 6,605,673, Specification; and U.S. Pat. No. 6,863,978, Specification). A liquid permeability test using physiological saline as the test solution, however, poorly reflects the liquid permeability in actual use with respect to urine. The fact has prompted the inventors to review the test, which has led to a finding that the test produces results that are highly related to the liquid permeability in actual use with respect to urine if the test solution contains L-ascorbic acid. By specifying the degraded liquid permeation rate with this new test scheme involving the use of a test solution containing L-ascorbic acid, one can obtain a water-absorbent resin composition from which a urine-absorbent article (diaper) with excellent liquid permeability in actual use can be made.

Details of the test scheme will be given later in examples of the invention. The degraded liquid permeation rate of the water-absorbent resin composition is preferably 1 to 35 seconds and more preferably 2 to 32 seconds.

When the water-absorbent resin composition is used as the absorbent substance in an absorbent article, such as a paper diaper, if the degraded liquid permeation rate is in excess of 40 seconds, liquid may not diffuse in the absorbent substance, possibly causing liquid blocking. The liquid may leak and cause skin rashes and other problems in the actual use of the paper diaper.

(b) Degraded Soluble Component

The water-absorbent resin composition preferably contains a 0 to 30 mass % degraded soluble component. The degraded soluble component is an indicator of the amount of a water-absorbent resin composition which has changed over time dissolved in physiological saline containing L-ascorbic acid. Details of the test scheme will be given later in examples of the invention.

Usually, the soluble component is measured using physiological saline as the test solution. Such a test, however, poorly reflects the liquid permeability in actual use with respect to urine. The fact has prompted the inventors to review the test, which has led to a finding that the test produces results that are highly related to the liquid permeability in actual use with respect to urine if the test solution contains L-ascorbic acid, as has been the case with the degraded liquid permeation rate. By specifying the degraded soluble component with this new test scheme involving the use of a test solution containing L-ascorbic acid, one can obtain a water-absorbent resin composition from which a urine-absorbent article (diaper) with excellent liquid permeability in actual use can be made.

The degraded soluble component can be made to fall in the above value range by, for example, specifying crosslink conditions for the polymerization into the water-absorbent resin, the particle size of the water-absorbent resin composition, conditions for the surface crosslinking, and the Fe cation content and the multivalent metal cation account in the water-absorbent resin composition.

The degraded soluble component in the water-absorbent resin composition is preferably 1 to 28 mass % and more preferably 2 to 25 mass %. If the degraded soluble component is in excess of 30 mass %, the water-absorbent resin containing such a water-absorbent resin composition is likely to develop breakoffs in the polymer chain and other degradation. The water-absorbent resin composition cannot retain a sufficient level of liquid permeability over time. Therefore, when the water-absorbent resin composition is used as the absorbent substance in an absorbent article, such as a paper diaper, liquid may not diffuse in the absorbent substance, possibly causing liquid blocking. The liquid may leak and cause skin rashes and other problems in actual use of the paper diaper.

(c) Centrifuge Retention Capacity (CRC)

The water-absorbent resin composition preferably has a centrifuge retention capacity (CRC) of at least 15 g/g, more preferably 20 to 60 g/g, more preferably 25 to 50 g/g, even more preferably 30 to 40 g/g. If the CRC is less than 15 g/g, the composition may not provide sufficient absorption in actual use. If the CRC is too high (for example, in excess of 50 g/g), the composition gives poor benefits in actual use in view of the high manufacture cost and could make it difficult to render another physical property (for example, degrade liquid permeability) fall in a preferred value range. The CRC is, for example, can be made to fall in the above value range by, for example, specifying conditions for the internal crosslinking of the water-absorbent resin, conditions for the surface crosslinking agent, and the Fe cation content and the multivalent metal cation content in the water-absorbent resin composition.

(d) Absorbency Against Pressure (AAP)

The water-absorbent resin composition preferably has an absorbency against pressure (AAP) of at least 15 g/g. The AAP is the absorption ratio of a water-absorbent resin composition under pressure (4.83 kPa, or about 0.7 psi). Details of the test scheme will be given later in examples of the invention.

The AAP of the water-absorbent resin composition is preferably at least 15 g/g, more preferably 20 to 40 g/g, even more preferably 22 to 30 g/g, most preferably 24 to 29 g/g. If the AAP of the water-absorbent resin composition is less than 15 g/g, the composition allows less liquid diffusion and absorbs less liquid under load (e.g., weight of the user). When the water-absorbent resin composition is used as the absorbent substance in an absorbent article, such as a paper diaper, the liquid may not diffuse in the absorbent article, possibly causing liquid blocking. The liquid may leak and cause skin rashes and other problems in actual use of the paper diaper.

If the AAP of the water-absorbent resin composition is too high (for example, in excess of 30 g/g), the composition gives poor benefits in actual use in view of high manufacturing cost and could make it difficult to obtain other physical properties. The AAP of the water-absorbent resin composition can be made to fall in the above value range by, for example, specifying the particle size of the water-absorbent resin composition, the type and amount of the surface crosslinking agent, the Fe cation content and the multivalent metal cation content in the water-absorbent resin composition.

(e) Coloring Value

The water-absorbent resin composition preferably has a coloring value (L value) of more than or equal to 90. The coloring value (L value) is one of indicators of coloring. The greater the value, the less the substance is colored. Details of the test scheme will be given later in examples of the invention. The coloring value of the water-absorbent resin composition can be made to fall in the above range by, for example, specifying the type of the monomer and temperature conditions for the polymerization of the monomer into the water-absorbent resin, and the Fe cation content and the multivalent metal cation content in the water-absorbent resin composition.

Water-absorbent resin compositions with improved liquid permeability are normally used at a high concentration (under a large weight) in diapers and like absorbent articles. If the coloring value (L value) is less than 90, when the water-absorbent resin composition is used as the absorbent substance in an absorbent article, such as a paper diaper, the absorbent article has a poor appearance, which reduces its commercial value.

(f) Shape

The water-absorbent resin composition may have a shape resembling fiber, sheet, or film. The composition however preferably has a particulate shape (particulate water absorption agent). More preferably, the composition has a particular particle size for higher liquid permeability. Specifically, the mass-average particle diameter (D50) is preferably 250 to 600 µm, more preferably 350 to 550 µm, and even more preferably 400 to 500 µm. Such particle sizes of the water-absorbent resin composition are achieved by, for example, pulverization, classification, granulation, and some other particle size controls.

The particles sized 150 to 850 µm account for preferably 90 to 100 mass %, more preferably 95 to 100 mass %, more preferably 99 to 100 mass %, of the entire mass (whole water-absorbent resin composition).

The logarithmic standard deviation ($\sigma\zeta$) of the particle size distribution is 0.10 to 0.50, preferably 0.20 to 0.40, more preferably 0.25 to 0.35. The bulk specific density thereof is preferably 0.50 to 0.82 g/cm$^2$, more preferably 0.55 to 0.78 g/cm$^2$, and even more preferably 0.60 to 0.75 g/cm$^2$.

If the water-absorbent resin composition has a particle size out of that value range, the composition contains a large amount of fine particles and large particles. The intended performance of a diaper (diaper performance) may not be achieved in actual use.

(g) Saline Flow Conductivity (SFC)

The water-absorbent resin composition has a saline flow conductivity (SFC) of preferably at least 1 (units: $\times 10^{-7} \cdot cm^3 \cdot s \cdot g^{-1}$), more preferably at least 5 (units: $\times 10^{-7} \cdot cm^3 \cdot s \cdot g^{-1}$), more preferably at least 20 (units: $\times 10^{-7} \cdot cm^3 \cdot s \cdot g^{-1}$), even more preferably at least 40 (units: $\times 10^{-7} \cdot cm^3 \cdot s \cdot g^{-1}$), most preferably at least 60 (units: $\times 10^{-7} \cdot cm^3 \cdot s \cdot g^{-1}$). If the water-absorbent resin composition has an SFC less than 1 (units: $\times 10^{-7} \cdot cm^3 \cdot s \cdot g^{-1}$), the intended performance of a diaper (diaper performance) may not achieved in actual use. The SFC of the water-absorbent resin composition can be rendered to fall in the above value range by, for example, specifying the particle size of the water-absorbent resin composition, conditions for the surface crosslinking, and the Fe cation content and the multivalent metal cation content in the water-absorbent resin composition.

(h) Residual Monomer

The residual monomer in the water-absorbent resin composition is controlled to preferably about 0 to 500 ppm, more preferably about 0 to 300 ppm. The residual monomer in the water-absorbent resin composition can be rendered to fall in the above value range by, for example, adjusting conditions for the polymerization into the water-absorbent resin and drying conditions.

(i) Water Content Ratio

The water-absorbent resin composition of the present invention further contains a small amount of water. The water content ratio of the water-absorbent resin composition, defined as the mass reduction in 3-hour drying at 180°C. per 1 g of the composition, is preferably 0.1 to 20 mass %, more preferably 1 to 15 mass %, even more preferably 1.5 to 10 mass %, still more preferably 2 to 6 mass %. If the water content ratio of the water-absorbent resin composition is less than 0.1 mass %, the water absorption rate may decrease, and the shock resistance of the composition in the form of powder may degrade. If the water-absorbent resin composition has a excessively low shock resistance, the water-absorbent resin composition powder may break during transport or fabrication (for example, when the powder is incorporated into a diaper), which undesirably degrades the physical properties detailed above (degraded liquid permeation rate, AAP, SFC, and shape). If the water-absorbent resin composition has an excessively high water content ratio, the water-absorbent resin composition has a low water-absorbent resin content, which degrades water absorbency. Thus, if the water-absorbent resin composition has a water content ratio in excess of 20 mass %, the water absorbency of the water-absorbent resin composition drops greatly, which is undesirable.

(5) Other Additives

The water-absorbent resin composition may further contain various additives, such as inorganic powder.

Specific examples of the inorganic powder include metal oxide, such as silicon dioxide and titanium oxide; silicic acid (salt), such as natural zeolite and synthetic zeolite; kaoline; talc; clay; and bentonite. Preferred among them are silicon dioxide and silicic acid (salt) which have an average particle diameter of 200 µm or less as measured with a Coulter counter.

If the inorganic powder is solid particles, the powder may be mixed with the water-absorbent resin by, for example, dry blending or wet blending in which both the components are particles. However, if both the powder and composition are particles, the water-absorbent resin composition may not mix uniformly with the inorganic powder or the water-absorbent resin composition may not sufficiently attach or bond to the inorganic powder. If such a water-absorbent resin composition is used in diapers and like absorbent articles, the water-absorbent resin composition and the inorganic powder may separate and segregate during the course of manufacture. That undesirably makes it difficult to manufacture diapers and like absorbent articles with uniform performance.

If the inorganic powder is solid particles, the powder is used in, for example, preferably 0 to 0.5 mass parts, more preferably 0 to 0.3 mass parts, even more preferably 0 to 0.1 mass parts, still more preferably 0 to 0.05 mass parts, to every 100 mass parts of the water-absorbent resin composition. The amount can vary depending on the combination of the water-absorbent resin and/or the water-absorbent resin composition. If the inorganic powder in the form of solid particles are added in excess of 0.5 mass parts, that undesirably makes it difficult to manufacture diapers and like absorbent articles with the uniform performance described above.

During the course of manufacture of the water-absorbent resin composition in accordance with the present invention, a deodorizing agent, an antibacterial agent, an aromatic, a foaming agent, a pigment, a dye, a plasticizer, an adhesive agent, a surfactant, a fertilizer, an oxidizing agent, a reducing agent, water, a salt, a germicidal agent, hydrophilic polymer (e.g. polyethylene glycol), paraffin, a hydrophobic polymer, a thermoplastic resin (e.g., polyethylene and polypropylene), a thermosetting resin (e.g., polyester resin and urea resin), etc. may be further added, where necessary, in such an amount that the liquid absorption rate (liquid diffusion rate) does not decrease. For example, about 0 to 10 mass parts of these materials may be added to the water-absorbent resin and/or the water-absorbent resin composition to every 100 mass parts of the water-absorbent resin and/or the water-absorbent resin composition.

(6) Usage

The water-absorbent resin composition in accordance with the present invention has excellent moisture absorption characteristics. The composition is applicable in wide range of fields for conventional water-absorbent resins from agriculture and gardening to water stopper for cable, civil engineering, construction, and food processing. The composition is also suitable for use as a solidifing agent (absorbent/gelling agent) for urine, feces, and blood because it has good liquid permeability which is an essential physical property for absorbent substances in diapers and like absorbent articles.

Generally, the absorbent substance is molded containing the water-absorbent resin composition. The absorbent substance contains the water-absorbent resin composition in an amount (core concentration) of preferably 20 to 100 mass %, more preferably 30 to 100 mass %, even more preferably 30 to 90 mass %, still more preferably 40 to 80 mass %, to the combined mass of the water-absorbent resin composition and the hydrophilic fiber. If the core concentration is less than 20 mass %, it becomes difficult to make use of the properties of the water-absorbent resin composition.

A preferred example of use of the absorbent substance produced from the water-absorbent resin composition in accordance with the present invention is an application to a water-absorbent complex which exhibits anisotropic expansion (the complex expands in the thickness direction) described as an example in the specification of U.S. Pat. No. 5,853,867. Using the water-absorbent resin composition in accordance with the present invention which shows excellent diffusion, the absorbent substance not only expands in the thickness direction, but also shows greatly improved liquid diffusion in horizontal directions (surface directions).

The absorbent substance is preferably compression molded to a density of 0.06 to 0.50 g/cc and a basic weight of 0.01 to 0.20 g/cm$^2$. The fiber base material used is hydrophilic fiber (for example, pulverized wood pulp), cotton linter, crosslinked cellulose fiber, rayon, cotton, wool, acetate, vinylon, etc. Preferably, these materials are used after being aerated.

The absorbent article in accordance with the present invention contains, for example, the absorbent substance, a liquid-permeable front sheet, and a liquid-impermeable back sheet. Specific examples of the absorbent article are hygienic materials, such as paper diapers for adults for which demand is rapidly growing, kid diapers, sanitary napkins, and so-called "incontinence pads."

A water-absorbent resin composition in accordance with the present invention, as described in the foregoing, is a water-absorbent resin composition (water absorption agent) characterized in that the composition contains: a polycarboxylate-based water-absorbent resin as a primary component, the resin having a crosslinked structure formed by polymerization of an acid group-containing unsaturated monomer; and multivalent metal cations, wherein: the multivalent metal cations other than Fe cations account for 0.001 to 1 mass % of the water-absorbent resin; and the ratio of the Fe cations to the multivalent metal cations other than the Fe cations is less than or equal to 5.00 mass %/o. Accordingly, a water-absorbent resin composition (water absorption agent) is provided which shows only small reduction in liquid permeability over time or in relation to another factor and limited coloring (especially, over time) and which is suitable for use in diapers and like absorbent articles, as well as for other practical purposes.

In the water-absorbent resin composition in accordance with the present invention, it is preferable if the ratio of the Fe cations to the multivalent metal cations other than the Fe cations is 1 to 3,000 ppm.

The arrangement further lowers the reduction in liquid permeability of the water-absorbent resin composition over time or in relation to another factor and also further limits the coloring (especially, over time) of the water-absorbent resin composition.

Another water-absorbent resin composition in accordance with the present invention is characterized in that the composition contains: a polycarboxylate-based water-absorbent resin as a primary component, the resin having a crosslinked structure formed by polymerization of an acid group-containing unsaturated monomer; multivalent metal cations; and a chelating agent, wherein: the multivalent metal cations other than Fe cations account for 0.001 to 1 mass % of the water-absorbent resin; and the ratio of the Fe cations to the multivalent metal cations other than the Fe cations is less than or equal to 50 mass %. Accordingly, a water-absorbent resin composition is provided which shows only small reduction in liquid permeability over time or in relation to another factor and limited coloring (especially, over time) and which is suitable for use in diapers and like absorbent articles, as well as for other practical purposes.

In the water-absorbent resin composition in accordance with the present invention, it is preferable if the ratio of the Fe cations to the multivalent metal cations other than the Fe cations is 200 to 5,000 ppm.

The arrangement further lowers the reduction in liquid permeability of the water-absorbent resin composition over time or in relation to another factor and also further limits the coloring (especially, over time) of the water-absorbent resin composition.

In the water-absorbent resin composition in accordance with the present invention, it is preferable if: the composition is of a particulate shape and contains the multivalent metal cations on surfaces thereof; and the composition is surface crosslinked by a surface crosslinking agent other than the metal cations.

The arrangement introduces a crosslinked structure to the water-absorbent resin not only by the multivalent metal cations, but also by another surface crosslinking agent. The synergistic effect further raises the liquid permeability of the water-absorbent resin composition. The arrangement not only raises the liquid permeability of the water-absorbent resin composition, but also improves the absorbency against pressure (AAP) of the water-absorbent resin composition. Furthermore, the arrangement restrains degradation of powder fluidity of the water-absorbent resin composition, which is likely to occur upon surface crosslinking. Therefore, with the arrangement, a water-absorbent resin composition is provided which shows only small reduction in liquid permeability over time or in relation to another factor, excellent absorbency against pressure, and limited degradation of powder fluidity and which is suitable for use in diapers and like absorbent articles, as well as for other practical purposes.

In the water-absorbent resin composition in accordance with the present invention, it is preferable if the multivalent metal cations are aluminum cations.

The arrangement further raises the liquid permeability of the water-absorbent resin composition and powder fluidity upon moisture absorption.

In the water-absorbent resin composition in accordance with the present invention, it is preferable if the composition has a degraded liquid permeation rate of greater than 0 and less than or equal to 40 seconds.

The arrangement enables the water-absorbent resin composition, when used in diapers and like absorbent articles, to retain sufficient liquid permeability in actual use over time. The arrangement provides an absorbent article with limited leakage.

In the water-absorbent resin composition in accordance with the present invention, it is preferable if the composition contains a 0 to 30 mass % degraded soluble component.

The arrangement enables the water-absorbent resin composition, when used in diapers and like absorbent articles, to retain sufficient liquid permeability in actual use over time. The arrangement provides an absorbent article with limited leakage.

In the water-absorbent resin composition in accordance with the present invention, it is preferable if the composition shows a coloring value (L value) of more than or equal to 90.0.

The arrangement enables the water-absorbent resin composition, when used in diapers and like absorbent articles, to show limited coloring for an extended period of time during distribution and long after purchase, not to mention immediately after its manufacture. The arrangement provides an absorbent article with an excellent commercial value.

In the water-absorbent resin composition in accordance with the present invention, it is preferable if: the composition is of a particulate shape; and the composition has a mass-average particle diameter of 250 to 600 µm and contains 90 to 100 mass % particles that have a particle diameter of 150 to 850 µm.

The arrangement reduces the fine and large particle content of the water-absorbent resin composition and gives the water-absorbent resin composition a particle size suitable for liquid permeability. The arrangement enables the water-absorbent resin composition, when used in diapers and like absorbent articles, to retain sufficient liquid permeability in actual use over time. The arrangement provides an absorbent article with limited leakage.

In the water-absorbent resin composition in accordance with the present invention, it is preferable if the acid group-containing unsaturated monomer contains 10 to 180 ppm methoxyphenol.

The arrangement enables the resultant water-absorbent resin to show further limited coloring (less yellowish or less yellowing).

A method of manufacturing a water-absorbent resin composition in accordance with the present invention is characterized in that the method involves the steps of: (a) polymerizing an acid group-containing unsaturated monomer into a polycarboxylate-based water-absorbent resin with a crosslinked structure; and (b) adding multivalent metal cations to the water-absorbent resin in 0.001 to 5 mass % to the water-absorbent resin, the ratio of Fe cations to the multivalent metal cations other than the Fe cations being less than or equal to 0.50 mass %. Accordingly, a water-absorbent resin composition is manufactured which shows only small reduction in liquid permeability over time or in relation to another factor and which is suitable for use in diapers and like absorbent articles, as well as for other practical purposes.

In the method of manufacturing a water-absorbent resin composition in accordance with the present invention, it is preferable if the method further involves the step of (c) surface crosslinking the water-absorbent resin by a surface crosslinking agent other than the multivalent metal cations, step (c) being different from step (b), wherein step (b) is carried out either in or after step (c).

The manufacturing method introduces a crosslinked structure to the water-absorbent resin not only by the multivalent metal cations, but also by another surface crosslinking agent. The synergistic effect further raises the liquid permeability of the water-absorbent resin composition. The method not only raises the liquid permeability of the water-absorbent resin composition, but also improves the absorbency against pressure (AAP) of the water-absorbent resin composition. Furthermore, the method restrains the degradation of powder fluidity of the water-absorbent resin composition, which is likely to occur upon surface crosslinking.

Therefore, with the method, a water-absorbent resin composition is manufactured which shows only small reduction in liquid permeability over time or in relation to another factor, excellent absorbency against pressure, and limited degradation of powder fluidity and which is suitable for use in diapers and like absorbent articles, as well as for other practical purposes.

In the method of manufacturing a water-absorbent resin composition in accordance with the present invention, it is preferable if the method further involves the step of (d) adding a chelating agent to the water-absorbent resin, wherein step (d) is carried out either in or after step (a).

The manufacturing method eliminates the need to refine or otherwise purify the multivalent metal cations before use. With the method, a water-absorbent resin composition is manufactured which shows only small reduction in liquid permeability over time or in relation to another factor and which is suitable for use in diapers and like absorbent articles, as well as for other practical purposes.

In the method of manufacturing a water-absorbent resin composition in accordance with the present invention, it is preferable if the method further involves the further step of (e) adjusting a methoxyphenol content in the acid group-containing unsaturated monomer used in step (a) to 10 to 180 ppm. If the acid group-containing unsaturated monomer is in a mixture of acrylic acid and sodium acrylate, which is a preferred embodiment, the methoxyphenol content is obtained as an unneutralized acrylic acid equivalent.

The arrangement enables the resultant water-absorbent resin to show further limited coloring (less yellowish or less yellowing).

An absorbent article in accordance with the present invention is characterized in that the article is at least one absorbent article selected from the group consisting of a paper diaper, a sanitary napkin, and an incontinence pad and contains a water-absorbent resin composition in accordance with the present invention. Accordingly, an absorbent article is provided which shows only small reduction in liquid permeability over time or in relation to another factor and limited coloring (especially, over time).

EXAMPLES

The following will describe the present invention in more detail by way of examples and comparative examples. The present invention is however by no means limited by these examples. The performance of the water-absorbent resin composition (or water-absorbent resin) was measured by methods discussed below. All electrical devices used in the examples operated at 200 V or 100 V and 60 Hz. Water-absorbent resin compositions and water-absorbent resins were used at 25°C.±2°C. and relative humidity of 50% RH, unless otherwise stated. A 0.90 mass % aqueous solution of sodium chloride was used as physiological saline.

The reagents and tools mentioned in the description of measurement methods and examples are mere examples and can be replaced with suitable alternatives.

The water-absorbent resin composition (or water-absorbent resin) is used as is (in the form available, for example, on the market with water content ratio and other factors not being adjusted) when its various performances are measured. When a commercially available water-absorbent resin composition (or water-absorbent resin) or a water-absorbent resin composition (or water-absorbent resin) in a diaper are used as samples in the measurement, however, these samples may have absorbed water over time. Under such circumstances, these samples are first dried to adjust the water content to 10 mass % or less, preferably to 5±2 mass %. Thereafter, the physical properties of the water-absorbent resin composition (or water-absorbent resin) specified in the present example of the invention can be measured. The drying may be carried out under any conditions, provided that the water-absorbent resin composition (or water-absorbent resin) is not decomposed or denatured; preferably, the drying is carried out at or above room temperature and at or below 60°C. under reduced pressure, for example.

Measurement of Coloring Value

Coloring values (L, a, and b values) of the water-absorbent resin composition obtained in the examples and comparative examples (detailed later) were measured using a spectral colorimeter manufactured by Nippon Denshoku Industries Co., Ltd. (SZ-Σ80 color measuring system).

Specifically, the coloring values were measured by reflection measurement. Powder and a standard round white board No. 2 for paste use were designated as standards. A sample base (powder/paste sample base; 30 mm in inner diameter and 12 mm in height) which was provided with the colorimeter and the light projection pipe (30 mm in inner diameter) were used.

The pre-provided sample base was charged with about 6 g of a water-absorbent resin composition (the pre-provided sample base was about 60% full). The surface color (L, a, b) were measured using the spectral colorimeter at room temperature (20 to 25°C.) and a humidity of 50% RH.

Subsequently, the sample base was placed in a thermostatic humidistat (Platinouslucifer, PL-2G, manufactured by Tabai Espec Co., Ltd.) adjusted to 50±1°C. and 90±1% RH and allowed to stand for 30 days. After that, the surface color (L, a, b) were measured using the spectral colorimeter.

Degraded Soluble Component 200.0 g of physiological saline containing 0.005 mass % L-ascorbic acid (prepared by dissolving 0.05 g of L-ascorbic acid in 999.95 g of 0.9 mass % physiological saline) was weighed and placed in a polypropylene container measuring 65 mm in inner diameter and 90 mm in height (capacity 250 cc). The container was charged with 1.0 g of a water-absorbent resin composition (or water-absorbent resin) obtained in an example or a comparative example (detailed later). After being sealed with an inner lid and an outer lid, the polypropylene container was placed in a thermostatic device (Sibata Thermotec SI-450 Incubator) at 37°C. and left for 16 hours. L-ascorbic acid is a degraded product of a water-absorbent resin found in urine.

Following that 16 hours, the polypropylene container was taken out. The content was stirred 1 hour with a stirrer chip at 600 rpm. The stirrer chip was a magnetic stirrer measuring 8 mm in diameter and 35 mm in length. After the stirring, a soluble component was extracted from the water-absorbent resin composition (or water-absorbent resin). The liquid extract was filtered with a paper filter ("JIS P 3801 No. 2,"Advantec Toyo Kaisha, Ltd.; thickness 0.26 mm; exclusion size 5 μm). 50.0 g of the resultant filtered solution was weighed as a measurement solution.

First, a 0.1 N aqueous solution of NaOH was added only to the physiological saline containing 0.005 mass % L-ascorbic acid to pH 10. Thereafter, a 0.1 N aqueous solution of HCl was added to pH 2.7 to determine blank titer ([bNaOH] ml, [bHCl]ml).

Similar titration was done for the measurement solution to determine titer ([NaOH]ml, [HCl]ml).

For example, for a water-absorbent resin containing a known amount of an acrylic acid and sodium salt thereof, the amount of the soluble component in the water-absorbent resin can be calculated from the average molecular weight of the monomer and the titer determined by the titration, using the following formula:

$$\text{Degraded Soluble Component (mass \%)}=0.1\times(\text{Average Molecular Weight of Monomer})\times 184.3\times 100\times([\text{HCl}]-[b\text{HCl}])/1000/1.0/50.0$$

$$\text{Neutrality Ratio (mol \%)}=[1-([\text{NaOH}]-[b\text{NaOH}])/([\text{HCl}]-[b\text{HCl}])]\times 100$$

If the amount of the acrylic acid and sodium salt thereof was unknown, the average molecular weight of the monomer was calculated from the neutrality ratio determined by the titration.

The average molecular weight of the monomer can be calculated using the following formula:

$$\text{Average molecular weight of Monomer}=\text{Neutrality Ratio (mol \%)}/100\times\text{Molecular Weight of Sodium Acrylate (94.05)}+(100-\text{Neutrality Ratio (mol \%)})/100\times\text{Molecular Weight of Acrylic Acid (72.06)}$$

Soluble Component

The same procedures were carried out as the measurement of degraded soluble component to calculated the soluble component, except that physiological saline was used in place of the physiological saline containing 0.005 mass % L-ascorbic acid.

Degraded Liquid Permeation Rate 200.0 g of physiological saline containing 0.005 mass % L-ascorbic acid (prepared by dissolving 0.05 g of L-ascorbic acid in 999.95 g of 0.9 mass % physiological saline) was weighed and placed in a polypropylene container measuring 65 mm in inner diameter and 90 mm in height (capacity 250 cc). The container was charged with 1.0 g of a water-absorbent resin composition obtained in an example or a comparative example (detailed later). After being sealed with an inner lid and an outer lid, the polypropylene container was placed in a thermostatic device (Sibata Thermotec SI-450 Incubator) at 37°C. and left for 16 hours.

Following that 16 hours, the polypropylene container was taken out. The degraded liquid permeation rate was measured using the device shown in FIG. 1. As shown in FIG. 1, the measuring device for the degraded liquid permeation rate is made up of: a cylindrical acrylic cell (inner diameter 60 mm; height 50 mm) 1 with a 100-mesh wire net (150 μm) 4 attached to one of two openings thereof; a support base 6; and a 20-mesh wire net (850 μm) 5 disposed on the support base 6. The acrylic cell 1 was placed on the 20-mesh wire net 5 so that a 100-mesh wire net 4 of the acrylic cell 1 could be in contact with the 20-mesh wire net 5.

All the water-absorbent resin composition 3 in the polypropylene container removed from the thermostatic device was placed to the acrylic cell 1. Water was removed from the top of the gel of the water-absorbent resin composition 3 until there was no liquid being left (to make the top of the gel flat). After removing water, a glass filter 2 was disposed on the water-absorbent resin composition 3 and let to stand for 1 minute. Following that 1 minute, 0.9 mass % physiological saline 7 (100 g) measured in a 100 mL beaker was poured into the acrylic cell 1. Time was measured from the start of the pouring until there was no liquid left on the top of the glass filter 2. That time measurement was the degraded liquid permeation rate (seconds).

Centrifuge Retention Capacity (CRC)

W g (=about 0.20 g) of a water-absorbent resin composition (or water-absorbent resin) obtained in an example or a comparative example (detailed later) was put in a bag of non-woven fabric (60 mm×85 mm; material complying with EDANA ERT 441.1-99) uniformly and sealed. The bag was immersed in 0.90 mass/n % physiological saline of which the temperature was regulated at 25±2°C. After 30 minutes, the bag was taken out and rid of water in a centrifugal separator (Compact Centrifugal Separator H-122, Kokusan Corp.) at 250 G (250×9.81 m/s$^2$) for 3 minutes. Then, the mass of the bag was measured (=W2 (g)). A similar operation was done without using the water-absorbent resin composition (or water-absorbent resin). The mass of the bag was measured again (=W1 (g)). CRC (g/g) was calculated from the masses W, W1, W2 using the following formula.

CRC (g/g)={(Mass $W2$ (g)–Mass $W1$ (g))/Mass $W$ (g)}−1

Absorbency Against Pressure (AAP)

A 400-mesh stainless steel wire net (openings 38 μm) was fused to the bottom of a plastic support cylinder with an inner diameter of 60 mm. W (g) (=about 0.90 g) of a water-absorbent resin composition (or water-absorbent resin) was placed uniformly on the net. A piston and a load were placed on the net in this order. The piston and load were tailored so that they could place a uniform load of 4.83 kPa (=about 0.7 psi) to the water-absorbent resin composition (or water-absorbent resin). The piston and load had an external diameter slightly less than 60 mm, formed no gap between them and the support cylinder, and could move up and down freely in the cylinder. The mass of the entire measuring system, including the measuring device, but minus the load itself, (the mass of the support cylinder, the water-absorbent resin composition (or water-absorbent resin), and the piston) was measured (=W3 (g)) before the load was placed.

A glass filter with a diameter of 90 mm and a thickness of 5 mm (available from Sogo Laboratory Glass Works Co., Ltd.; narrow hole diameter 100 to 120 μm) was placed on a petri dish with a diameter of 150 mm. 0.90 mass % physiological saline was added so that the saline was flush was the top of the glass filter. A piece of paper filter with a diameter of 90 mm (No. 2, JIS P 3801, Toyo Roshi Kaisha, Ltd., Advantec) was placed on top of it so that the surface could be all wet. Excess liquid was removed.

The entire measuring system, including the measuring device, was placed on the wet paper filter mentioned above. The water-absorbing resin composition (or water-absorbing resin) absorbed the liquid under load. If the liquid surface lowered below the top of the glass filter, liquid was added to maintain the liquid surface at a constant level. After 1 hour, the system, including the measuring device, was lifted. The mass of the system minus the load (the mass of the support cylinder, the swollen water-absorbent resin composition (or water-absorbent resin), and the piston) was measured again (=W4 (g)). AAP (g/g) was calculated from the masses W, W3, W4 using the following formula.

AAP (g/g)=(Mass $W4$ (g)−Mass $W3$ (g))/$W$ (g)

Mass-Average Particle Diameter (D50) and Logarithmic Standard Deviation (σζ)

A water-absorbent resin composition (or water-absorbent resin) was sieved using JIS-compliant sieves with openings measuring, for example, 850 μm, 710 μm, 600 μm, 500 μm, 300 μm, 150 μm, and 45 μm. The residual percentages R were plotted on logarithm probability paper. The particle diameter corresponding to R=50 mass % was read from the graph. The reading was the mass-average particle diameter (D50)). The logarithmic standard deviation (σζ) is given by:

σζ=0.5×ln($X2/X1$)

where X1 and X2 are particle diameters respectively for R=84.1 and R=15.9%. The smaller the σζ, the narrower the particle size distribution.

For the measurement of the mass-average particle diameter (D50) and the logarithmic standard deviation (σζ), the particles were classified as follows. 10.0 g of the water-absorbent resin composition (or water-absorbent resin) was placed in JIS-compliant sieves (Iida Testing Sieves; diameter 8 cm) with openings measuring 850 μm, 710 μm, 600 μm, 500 μm, 300 μm, 150 μm, and 45 μm at room temperature (20 to 25°C.) and 50% RH humidity. The sieves were shaken in a vibration classifier (Iida Sieve Shaker, ES-65, Ser. No. 0501) for 5 minutes to complete classification. Basically, the sieves of the types mentioned here were used; sieves of other types however could also be used if they were suited for the particle size of the water-absorbent resin.

Saline Flow Conductivity (SFC)

SFC is a value which indicates the permeability of a swollen water-absorbent resin to liquid. The greater the SFC value, the higher the liquid permeability.

A saline flow conductivity (SFC) test was conducted as described in Published Japanese Translation of PCT Application 9-509591/1997 (Tokuhyohei 9-50959).

Figure 2:
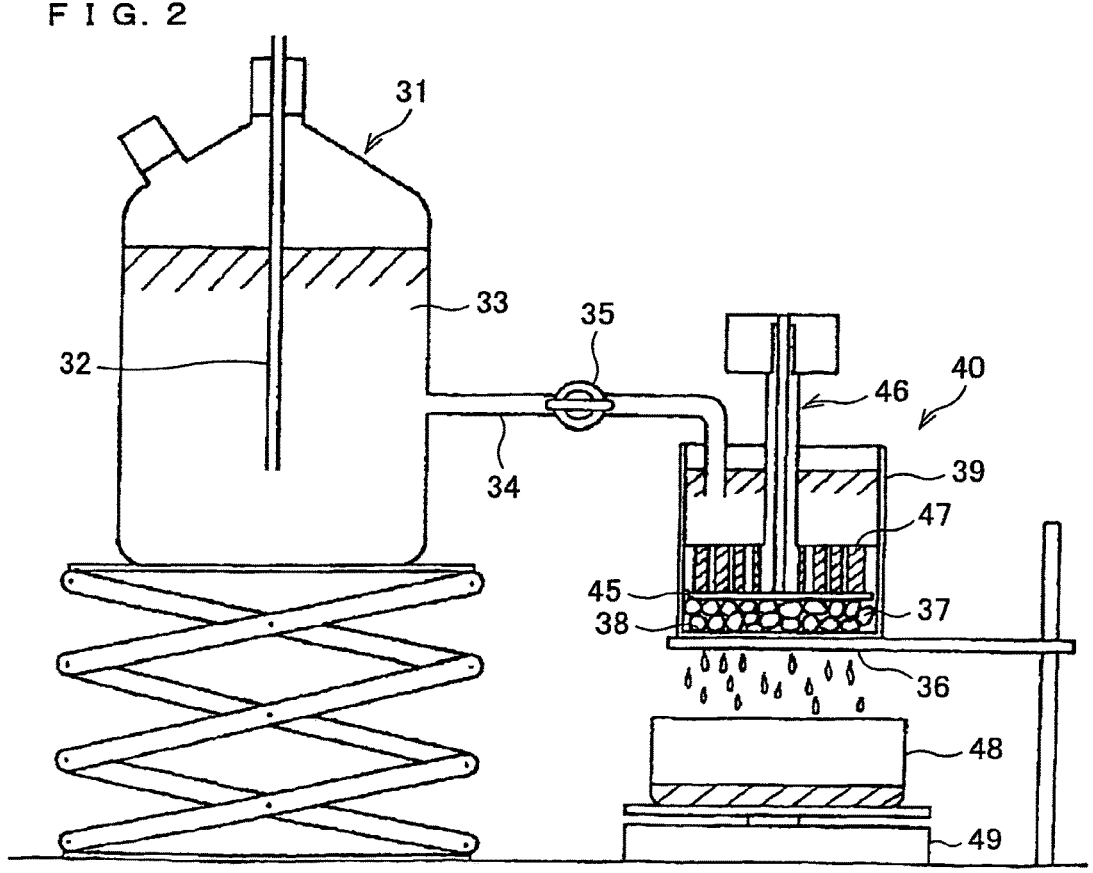
FIG. 2 is a cross-sectional view schematically illustrating the arrangement of a device which measures the saline flow conductivity (SFC) of a water-absorbent resin composition.

The following will describe devices used in a SFC test in reference to FIG. 2.

The device shown in FIG. 2 has a glass tube 32 inserted in a container 31. The lower end of the glass tube 32 is positioned so as to maintain 0.69 mass % physiological saline 33 at a height of 5 cm above the bottom of a swollen gel 37 in a cell 39. The 0.69 mass % physiological saline 33 in the container 31 is supplied to the cell 39 via an L-shaped tube 34 fitted with a cock 35. Below the cell 39 is there positioned a container 48 which collects liquid which has been passed through. The container 48 sits on pan scales 49. The cell 39 has an inner diameter of 6 cm and is fitted on its bottom with a No. 400 stainless steel wire net (openings 38 μm) 38. The piston 46 has, on its lower part, holes 47 which sufficiently let liquid pass through them. The piston 46 is fitted on its bottom a high permeability glass filter 45 to prevent the water-absorbent resin composition (or water-absorbent resin) or its swollen gel from entering the holes 47. The cell 39 is placed on a base which supports the cell 39. A stainless steel wire net 36 is placed on the surface of the base which is in contact with the cell 39. The net 36 does not disrupt liquid transmission.

Using the device shown in FIG. 2, a water-absorbent resin (0.900 g) placed uniformly in the container 40 was let to swell in artificial urine under a pressure of 2.07 kPa (=about 0.3 psi) for 60 minutes. The height of the gel layer in the gel 37 was recorded. Next, the 0.69 mass % physiological saline 33 was passed from the container 31 through the swollen gel layer under a pressure of 2.07 kPa (=about 0.3 psi) while maintaining hydrostatic pressure at a constant value. The SFC test was conducted at room temperature (25°C.±2°C.). The amount of liquid passed through the gel layer was recorded as a function of time at 20-second intervals over 10 minutes, using a computer and the pan scales 49. The flow rate Fs (units: g/s) at time T through the swollen gel 37 (chiefly between particles) was determined by dividing weight increase (g) by time (s). Suppose that a constant hydrostatic pressure and a stable flow rate were achieved at time Ts. Flow rates were calculated only from data collected between time Ts and time Ts+10 minutes. These flow rates were then used to calculate Fs at T=0, that is, the first flow rate through the gel layer. Fs at T=0 was calculated by extrapolating Fs(T) by a least square method to T=0. The units of SFC were $10^{-7} \cdot cm^3 \cdot s \cdot g^{-1}$.

$$SFC=(Fs(T=0) \times L0)/(\rho \times A \times \Delta P)=(Fs(T=0) \times L0)/139506$$

where
Fs(T=0): Flow rate in g/s
L0: Height of gel layer in cm
$\rho$: Density of NaCl solution (=1.003 g/cm$^3$)
A: Area of upper surface of gel layer in cell 41 (=28.27 cm$^2$)
$\Delta P$: Hydrostatic pressure exerted on gel layer (=4920 dyne/cm$^2$)

The artificial urine used in the SFC test contained 0.25 g of dihydrate of calcium chloride, 2.0 g of potassium chloride, 0.50 g of hexahydrate of magnesium chloride, 2.0 g of sodium sulfate, 0.85 g of ammonium dihydrogen phosphate, 0.15 g of diammonium hydrogen phosphate, and 994.25 g of pure water.

Method of Quantification of Multivalent Metal Component in Water-Absorbent Resin (i) Plasma Emission Spectrometry 1.0 g of a water-absorbent resin composition was weighed and placed in a polypropylene beaker with a capacity of 260 mL. 190.0 g of physiological saline (0.9 mass % NaCl aqueous solution) and 10.0 g of 2 N hydrochloric acid were added and stirred 30 minutes with a stirrer chip (magnetic stirrer, diameter 8 mm, length 35 mm) at 600 rpm at room temperature. After the stirring, the supernate was filtered by a chromatodisk (GL chromatodisk 25A, GL Sciences Inc.). The filtrate was analyzed by plasma emission spectrometry (Ultima, Horiba Ltd.) to determine the multivalent metal component concentration. A calibration curve was drawn using a physiological saline containing a known amount of multivalent metal component. In the analysis above, a base line correction was carried out considering the composition of the physiological saline. From that concentration, the multivalent metal component concentration in the water-absorbent resin composition was calculated using the formula:

Multivalent Metal Component Concentration in Water-absorbent Resin Composition (mass %)= (Multivalent Metal Component Concentration in Solution (mass %))×200

From the multivalent metal component concentration (mass %) in the water-absorbent resin composition, the multivalent metal component concentration in the water-absorbent resin was determined using the following:

Multivalent Metal Component Concentration in Water-absorbent Resin (mass %)=Multivalent Metal Concentration in Water-absorbent Resin Composition (mass %)/Water-absorbent Resin in Water-absorbent Resin Composition (mass %)×100

(ii) Method of Measurement of Multivalent Metal Component Extraction Ratio

Multivalent metal component extraction ratio reflects the state of a multivalent metal in a water-absorbent resin, that is, whether the multivalent metal has formed salt which is highly insoluble to water or salt which is easily soluble to water. For example, in the case of aluminum sulfate added to a water-absorbent resin, the ratio reflects whether the aluminum sulfate is present in such a state that it has surface crosslinked the water-absorbent resin or as present it is. Specifically, the ratio indicates how much of the aluminum sulfate added to the water-absorbent resin composition remains as aluminum sulfate. The following will describe how to measure the multivalent metal component extraction ratio.

95 g of a methanol solution of 1.0 mass % 8-quinolinol (obtained from Wako Pure Chemical Ind.) was mixed with 5 g of pure water to prepare solution A. 95 g of methanol was mixed with 5 g of pure water mix to prepare solution B.

A stirrer chip (magnetic stirrer, diameter 8 mm, length 35 mm) was placed in a 260-mL polypropylene container. 5 g of a water-absorbent resin composition and 25 g of solution A were weighed and placed in the container. The container was then sealed. The content was stirred for 20 hours with the magnetic stirrer at 600 rpm at room temperature. 5 mL of the resultant supernate was sucked by a polypropylene syringe. A chromatodisk (GL chromatodisk 25A, GL Sciences Inc.) was attached to the syringe with which the solution was measured and sucked, to filter the supernate. Part of the filtrate was transferred to a 1-cm plastic cell (Dispocell, Model No. 2-478-03, Type No. 1939, purchased from Asone Corp.). Absorption of particular wavelength which occurs due to the formation of a multivalent metal component/8-quinolinol complex was measured by a spectrophotometer (Hitachi Ratio Beam Spectrophotometer U-1100). The particular wavelength is, for example, 380 nm if the multivalent metal component is aluminum. For convenience, the following will assume that the multivalent metal component is aluminum and that the particular wavelength is 380 nm. If the 380-nm absorption by the filtrate is beyond the measurable range of the spectrophotometer, the filtrate is diluted by solution B so that the absorption falls in the measurable range of the spectrophotometer.

The absorption when 100 mass % of the multivalent metal component was extracted was obtained by measuring the 380-nm absorption by a solution in which the multivalent metal compound was so dissolved in solution A that the same amount of multivalent metal component would be present as when 100 mass % of the multivalent metal component was extracted. The multivalent metal component concentration in the water-absorbent resin composition was separately obtained by the plasma emission spectrometry described earlier.

The extraction ratio for the multivalent metal component is given by:

Extraction Ratio for Multivalent Metal Component (mass %)=((Absorbency of 380 nm by Filtrate)−(Absorbency of 380 nm by Solution $A$))/ ((Absorbency of 380 nm by Multivalent Metal Component Extracted 100 mass %)−(Absorbency of 380 nm by Solution $A$))×100

Methoxyphenol Content, Furfural Content

Quantitative analysis was performed on standard samples under the following conditions, using a gas chromatograph (made by Shimadzu Corporation, GC-7A model) and a data processor (made by Shimazu Corporation, C-R6A model) to obtain the methoxyphenol content and the furfural content in the monomer (acrylic acid):

Detector: FID
Temperature of Column Thermostat Bath: 200°C.
Temperature of Sample-introducing Section: 250°C.
Column: High Polarity Capillary Column (30 cm in length, 0.5 mm in inner diameter, and 1.5 µm in thickness).

For the case of compositions of acrylic acid and sodium acrylate, the methoxyphenol content and the furfural content were obtained as an acrylic acid equivalent.

Reference Example 1

An aqueous solution of sodium acrylate having a neutrality ratio of 71.3 mol % (the p-methoxyphenol content in the acrylic acid was 200 ppm; the furfural content in the acrylic acid was 0.5 ppm) was prepared from an acrylic acid refined by distilling a commercially available acrylic acid (special grade reagent containing 200 ppm p-methoxyphenol, manufactured by Wako Pure Chemical Ind.) and a commercially available sodium hydroxide (special grade reagent manufactured by Wako Pure Chemical Ind.). 4.0 mass parts of polyethylene glycol diacrylate (average number of ethylene oxide added=8 moles) was dissolved in 5,500 mass parts (monomer concentration=38 mass %) of that aqueous solution of sodium acrylate, to prepare a reaction solution. The reaction solution was deaerated for 30 minutes in a nitrogen gas atmosphere. Next, the reaction solution was placed in a reaction vessel which was a lidded stainless steel double-arm kneader with two sigma-type blades and a jacket (internal volume 10 L). Nitrogen gas was substituted in the reaction vessel while maintaining the reaction solution at 30° C.

Subsequently, 2.8 g of sodium persulfate and 0.01 g of L-ascorbic acid were added in the form of aqueous solution while stirring the reaction solution. About 1 minute after the addition, polymerization started. Polymerization was carried out initially at 30°C. and then at 30 to 90°C. 60 minutes into the polymerization, a water-containing gel-like crosslinked polymer was removed. The obtained water-containing gel-like crosslinked polymer was divided into fragments, each measuring about 1 to 2 mm in diameter. The divided water-containing gel-like polymer was spread on a 300 μm wire net and dried in hot wind at 150°C. for 90 minutes. The dried product was pulverized in a vibration mill and classified using a 850-μm-opening wire net for particle size adjustment, to prepare irregularly pulverized water-absorbent resin powder.

100 mass parts of the obtained water-absorbent resin powder was mixed with an organic surface crosslinking agent containing 0.5 mass part propylene glycol, 0.03 mass part ethylene glycol diglycidyl ether, 0.3 mass part 1,4-butanediol, and 3 mass part water. The mixture was heated at 200°C. for 40 minutes to yield a water-absorbent resin.

The obtained water-absorbent resin showed a centrifuge retention capacity (CRC) of 30 g/g, an absorbency against pressure (AAP) of 25.8 g/g, and a saline flow conductivity (SFC) of $35 \times 10^{-7} \cdot cm^3 \cdot s \cdot g^{-1}$. Besides, the resin showed a mass-average particle diameter (D50) of 420 μm and a logarithmic standard deviation (σζ) of 0.42. The resin contained particles sized 150 to 850 μm in a proportion of at least 96.9% to the resin composition.

As to the coloring values of the water-absorbent resin, the L value was 90.2, the a value was −0.37, the b value was 5.5. The degraded soluble component was 25.1%.

Reference Example 2

1.0 mass parts of a 50% aqueous solution of aluminum sulfate (containing 10 ppm Fe cations, Asahi Chemical Co., Ltd.), 0.025 mass parts of propylene glycol, and 0.167 mass parts of a 60% aqueous solution of sodium lactate were mixed to prepare preparation solution (a).

Mixed solutions (b-1) to (b-7) were prepared by adding a 10% aqueous solution of ferrous sulfate to preparation solution (a). Each mixed solution (b-1) to (b-7) contained 1.192 mass parts of preparation solution (a). Mixed solutions (b-1) to (b-7) contained, respectively, 0.0027 mass parts, 0.027 mass parts, 0.14 mass parts, 0.27 mass parts, 0.54 mass parts, 1.4 mass parts, and 2.7 mass parts of the 10% aqueous solution of ferrous sulfate.

Mixed solutions (c-1) to (c-7) were prepared by further adding a 46 mass % aqueous solution of trisodium diethylenetriamine pentacetate (Chelest PC-45, Chubu Chelest Co., Ltd.) to mixed solutions (b-1) to (b-7). Mixed solution (c-1) to (c-7) contained, respectively, 0.0007 mass parts, 0.007 mass parts, 0.033 mass parts, 0.066 mass parts, 0.131 mass parts, 0.328 mass parts, and 0.656 mass parts of the 46 mass % aqueous solution of trisodium diethylenetriamine pentacetate. The molar quantity of the trisodium diethylenetriamine pentacetate in each mixed solution (c-1) to (c-7) was equivalent to 0.37 times the molar quantity of the Fe cations (ferrous sulfate).

Reference Example 3

A water-absorbent resin composition was prepared by following the same procedures as in reference example 1, except that a different reaction solution was used. The reaction solution was prepared by dissolving 6.0 mass parts of polyethylene glycol diacrylate (average number of ethylene oxide added=8 moles) in 5,500 mass parts of the aqueous solution of sodium acrylate having a neutrality ratio of 71.3 mol % used in reference example 1.

The obtained water-absorbent resin showed a centrifuge retention capacity (CRC) of 27 g/g, an absorbency against pressure (AAP) of 25 g/g, and a saline flow conductivity (SFC) of $60 \times 10^{-7} \cdot cm^3 \cdot s \cdot g^{-1}$. Besides, the resin showed a mass-average particle diameter (D50) of 430 μm and a logarithmic standard deviation (σζ) of 0.41. The resin contained particles sized 150 to 850 μm in a proportion of at least 97.1% to the resin composition. As to the coloring values of the water-absorbent resin, the L value was 91.0, the a value was −0.35, the b value was 5.4. The degraded soluble component was 20.1%.

Example 1

1.192 mass parts of preparation solution (a) was added to and mixed with 100 mass parts of the water-absorbent resin obtained in reference example 1. The mixture was put into vinyl bag fitted with a zipper and let to cure for 1 hour in a drier device at 60°C. After the curing, the mixture was passed through a 20-mesh (850 μm) sieve to yield a water-absorbent resin composition (D-1). The obtained water-absorbent resin composition showed a centrifuge retention capacity (CRC) of 30 g/g, an absorbency against pressure (AAP) of 24.2 g/g, and a saline flow conductivity (SFC) of $60 \times 10^{-7} \cdot cm^3 \cdot s \cdot g^{-1}$. Besides, the resin showed a mass-average particle diameter (D50) of 420 μm and a logarithmic standard deviation (σζ) of 0.42. The resin contained particles sized 150 to 850 μm in a proportion of 96.9% to the resin composition. Measurements of the coloring values, degraded soluble component, and degraded liquid permeation rate of water-absorbent resin composition (D-1) are shown in Table 1.

Examples 2, 3

Water-absorbent resin compositions (D-2), (D-3) were prepared by following the same procedures as in example 1, except that 1.195 mass parts of mixed solution (b-1) and 1.219 mass parts of mixed solution (b-2), instead of the 1.192 mass parts of preparation solution (a), were added respectively to form compositions (D-2), (D-3). Obtained water-absorbent resin compositions (D-2), (D-3) showed an equal centrifuge retention capacity (CRC), absorbency against pressure (AAP), and saline flow conductivity (SFC)

to those of water-absorbent resin composition (D-1). Compositions (D-2), (D-3) also showed an equal mass-average particle diameter (D50) and logarithmic standard deviation (σζ to those of composition (D-1). Compositions (D-2), (D-3) contained particles sized 150 to 850 μm in the same proportion as composition (D-1). Measurements of the coloring values, degraded soluble component, and degraded liquid permeation rate of water-absorbent resin compositions (D-2), (D-3) are shown Table 1.

Examples 4 to 8

Water-absorbent resin compositions (D-4) to (D-8) were prepared by following the same procedures as in example 1, except that 1.195 mass parts of mixed solution (c-1), 1.226 mass parts of mixed solution (c-2), 1.361 mass parts of mixed solution (c-3), 1.529 mass parts of mixed solution (c-4), and 1.866 mass parts of mixed solution (c-5), instead of the 1.192 mass parts of preparation solution (a), were added respectively to form compositions (D-4) to (D-8). Obtained water-absorbent resin compositions (D-4) to (D-8) showed an equal centrifuge retention capacity (CRC), absorbency against pressure (AAP), and saline flow conductivity (SFC) to those of water-absorbent resin composition (D-1). Compositions (D-4) to (D-8) also showed an equal mass-average particle diameter (D50) and logarithmic standard deviation (σζ) to those of composition (D-1). Compositions (D-4) to (D-8) contained particles sized 150 to 850 μm in the same proportion as composition (D-1). Measurements of the coloring values, degraded soluble component, and degraded liquid permeation rate of water-absorbent resin compositions (D-4) to (D-8) are shown in Table 1.

Comparative Examples 1 to 5

Water-absorbent resin compositions (D-9) to (D-13) were prepared by following the same procedures as in example 1, except that 1.332 mass parts of mixed solution (b-3), 1.462 mass parts of mixed solution (b-4), 1.732 mass parts of mixed solution (b-5), 2.592 mass parts of mixed solution (b-6), and 3.892 mass parts of mixed solution (b-7), instead of the 1.192 mass parts of preparation solution (a), were added respectively to form compositions (D-9) to (D-13). Obtained water-absorbent resin compositions (D-9) to (D-13) showed an equal centrifuge retention capacity (CRC), absorbency against pressure (AAP), and saline flow conductivity (SFC) to those of water-absorbent resin composition (D-1). Compositions (D-9) to (D-13) also showed an equal mass-average particle diameter (D50) and logarithmic standard deviation (σζ) to those of composition (D-1). Compositions (D-9) to (D-13) contained particles sized 150 to 850 μm in the same proportion as composition (D-1). Measurements of the coloring values, degraded soluble component, and degraded liquid permeation rate of water-absorbent resin compositions (D-9) to (D-13) are shown in Table 1.

Comparative Examples 6, 7

Water-absorbent resin compositions (D-14), (D-15) were prepared by following the same procedures as in example 1, except that 2.877 mass parts of mixed solution (c-6) and 4.563 mass parts of mixed solution (c-7), instead of the 1.192 mass parts of preparation solution (a), were added respectively to form compositions (D-14), (D-15). Obtained water-absorbent resin compositions (D-14), (D-15) showed an equal centrifuge retention capacity (CRC), absorbency against pressure (AAP), and saline flow conductivity (SFC) to those of water-absorbent resin composition (D-1). Compositions (D-14), (D-15) also showed an equal mass-average particle diameter (D50) and logarithmic standard deviation (σζ) to those of composition (D-1). Compositions (D-14), (D-15) contained particles sized 150 to 850 μm in the same proportion as composition (D-1). Measurements of the coloring values, degraded soluble component, and degraded liquid permeation rate of water-absorbent resin compositions (D-14), (D-15) are shown in Table 1.

Example 9

A commercially available acrylic acid (special grade reagent containing 200 ppm p-methoxyphenol, manufactured by Wako Pure Chemical Ind.) prepared by gas phase catalytic oxidation was placed on the bottom of a high boiling point impurity separation tower equipped with 50 stages perforated boards without downcomer, for distillation at a reflux ratio of 1. The distilled acrylic acid was distilled again under the same conditions. Next, p-methoxyphenol was added to the redistilled acrylic acid to obtain refined acrylic acid. The refined acrylic acid contained 90 ppm p-methoxyphenol and furfural in an amount less than or equal to the detectable limit (1 ppm). The same procedures were carried out as in reference example 1, except that the refined acrylic acid was used in place of the acrylic acid in reference example 1 (that is, an aqueous solution of sodium acrylate (monomer concentration 38 mass %) prepared by neutralizing the refined acrylic acid to a neutrality ratio of 71.3 mol % was used in place of the acrylic acid in reference example 1), to prepare a water-absorbent resin. Furthermore, the same procedures were carried out as in example 1 to prepare water-absorbent resin composition (D-16).

Obtained water-absorbent resin composition (D-16) showed an equal centrifuge retention capacity (CRC), absorbency against pressure (AAP), and saline flow conductivity (SFC) to those of water-absorbent resin composition (D-1). Composition (D-16) also showed an equal mass-average particle diameter (D50) and logarithmic standard deviation (σζ) to those of composition (D-1). Composition (D-16) contained particles sized 150 to 850 μm in the same proportion as composition (D-1). Measurements of the coloring values, degraded soluble component, and degraded liquid permeation rate of water-absorbent resin composition (D-16) are shown in Table 1.

Comparative Example 8

A water-absorbent resin was prepared by following the same procedures as in example 9, except that a commercially available acrylic acid (special grade reagent containing 200 ppm p-methoxyphenol, manufactured by Wako Pure Chemical Ind.), instead of the refined acrylic acid, was used as the acrylic acid. The same procedures were carried out as in comparative example 7 to prepare water-absorbent resin composition (D-17).

Obtained water-absorbent resin composition (D-17) showed an equal centrifuge retention capacity (CRC), absorbency against pressure (AAP), and saline flow conductivity (SFC) to those of water-absorbent resin composition (D-1). Composition (D-17) also showed an equal mass-average particle diameter (D50) and logarithmic standard deviation (σζ) to those of composition (D-1). Composition (D-17) contained particles sized 150 to 850 μm in the same proportion as composition (D-1). Measurements of the coloring values, degraded soluble component, and degrade liquid permeation rate of water-absorbent resin composition (D-17) are shown in Table 1. Water-absorbent resin composition (D-17) exhibited the following coloring values after being left to stand for 30 days at 50°C. and 90% RH: L=53.2, a=6.6, and b=16.1.

Comparative Example 9

A 2-L polyethylene container was charged with 100 mass parts of the water-absorbent resin obtained by reverse phase suspension polymerization (detailed below) and 2 mass parts of sodium sulfite A ("Sulfurous Anhydride of Soda for Food Additive"containing 1.4 ppm iron, manufactured by Daito Chemical Col, Ltd.). The mixture was then mixed for 1 hour in a cross rotary mixer at a rotation rate of 30 rpm and revolution rate of 30 rpm to obtain water-absorbent resin composition (D-18). Water-absorbent resin composition (D-18) contained 0.3 ppm iron.

Manufacture of Water-Absorbent Resin by Reverse Phase Suspension Polymerization: An Example A five-necked cylindrical round bottom flask with a capacity of 1000 mL equipped with a stirrer, a reflux cooler, a dropping funnel, a thermometer, and a nitrogen gas introduction tube was charged with 500 mL of n-heptane. 0.92 g of sucrose fatty acid ester (S-370 manufactured by Mitsubishi Chemical, Co., Ltd.) with a HLB of 3.0 was then added and dispersed as a surfactant to dissolve the surfactant.

Apart from the five-necked cylindrical round bottom flask, a triangle flask with a capacity of 500 mL was charged with 92 g of an 80 mass % aqueous solution of acrylic acid (the acrylic acid was the aforementioned commercially available acrylic acid (special grade reagent containing 200 ppm p-methoxyphenol, manufactured by Wako Pure Chemical Ind.)). 102.2 g of a 30 mass % aqueous solution of sodium hydroxide was added dropwise to the triangle flask while the flask was being externally cooled, so as to prepare a partly neutralized product of acrylic acid in which 75 mol % of the acrylic acid was neutralized. Furthermore, 50.2 g of water, 0.11 g of potassium persulfate as a polymerization initiator, and 9.2 mg of ethylene glycol diglycidyl ether as a crosslink agent were added to the partly neutralized product of the acrylic acid to prepare an unsaturated aqueous solution of monomer for the first-stage polymerization.

The entire unsaturated aqueous solution of monomer for the first-stage polymerization was added and dispersed in the five-necked cylindrical round bottom flask mentioned above, while stirring the content of the five-necked cylindrical round bottom flask. Nitrogen gas was introduced into the system until it sufficiently substitutes the inner gas. The flask was then heated to 50°C. and maintained in a bath at 70°C. to let a polymerization reaction proceed for 1 hour. The flask was cooled down to room temperature to obtain a liquid of polymerization slurry.

Another triangle flask of a capacity of 500 mL was charged with 119.1 g of an 80 mass % aqueous solution of acrylic acid (the acrylic acid was the aforementioned commercially available acrylic acid (special grade reagent containing 200 ppm p-methoxyphenol, manufactured by Wako Pure Chemical Ind.)). 132.2 g of a 30 mass % aqueous solution of sodium hydroxide (iron content: 0.2 ppm) was added dropwise to the triangle flask while the flask was being cooled down to neutralize 75 mol % of the acrylic acid. Then, 27.4 g of water, 0.14 g of potassium persulfate, and 35.7 mg of ethylene glycol diglycidyl ether were added to prepare an unsaturated aqueous solution of monomer for the second-stage polymerization. The flask was cooled in an iced water bath.

The unsaturated aqueous solution of monomer for the second-stage polymerization was entirely added to the liquid of polymerization slurry. Thereafter, nitrogen gas was introduced into the system until it sufficiently substitutes the inner gas. The bath was then maintained at 70°C. to let a second-stage polymerization reaction proceed for 2 hours. After the termination of the polymerization reaction, water was removed from the system (water-containing gel-like substance dispersed in n-heptane) by azeotropic distillation with the n-heptane. 8.44 g of a 2 mass % aqueous solution of ethylene glycol diglycidyl ether was added to the obtained gel-like substance. Then, water and the n-heptane were removed by distillation to dry the substance. 215.5 g of a water-absorbent resin was thus obtained. Comparative composition (D-18) was obtained as in comparative example 1.

Example 10

Water-absorbent resin composition (D-4') was prepared by following the same procedures as in example 4, except that trisodium diethylenetriamine pentacetate in mixed solution (b-4) was used instead of salt of trisodium methyl glycine diacetate. Measurements of the coloring values, degraded soluble component, and degraded liquid permeation rate of water-absorbent resin composition (D-4') are shown in Table 1.

Example 11

Water-absorbent resin composition (D-19) was prepared by following the same procedures as in example 1, except that 1.788 mass parts of preparation solution (a) was added to and mixed with 100 mass parts of the water-absorbent resin obtained in reference example 3 instead of adding and mixing 1.192 mass parts of preparation solution (a) with 100 mass parts of the water-absorbent resin obtained in reference example 1.

The obtained water-absorbent resin composition showed a centrifuge retention capacity (CRC) of 27 g/g, an absorbency against pressure (AAP) of 24 g/g, and a saline flow conductivity (SFC) of $100 \times 10^{-7} \cdot cm^3 \cdot s \cdot g^{-1}$. Besides, the composition showed a mass-average particle diameter (D50) of 420 μm and a logarithmic standard deviation (σζ) of 0.42. The resin contained particles sized 150 to 850 μm in a proportion of at least 96.1% to the resin composition. Measurements of the coloring values, degraded soluble component, and degraded liquid permeation rate of water-absorbent resin composition (D-19) are shown in Table 1.

TABLE 1

| | Water-Absorbing Resin Compositon | Multivalent Metal Cations (wt %) *1 | Fe²⁺ (ppm) *2 | Chelating Agent (ppm) *1 | Coloring Values L | a | b | Degraded Soluble Component (%) | Degraded Liquid Permeability Rate (sec.) |
|---|---|---|---|---|---|---|---|---|---|
| Example 1 | D-1 | 0.044 | 227 | — | 90.1 | −0.52 | 6.0 | 27.9 | 33 |
| Example 2 | D-2 | 0.044 | 2273 | — | 90.2 | −0.49 | 6.0 | 28.2 | 32 |
| Example 3 | D-3 | 0.044 | 22727 | — | 90.1 | −0.45 | 6.1 | 28.2 | 33 |
| Example 4 | D-4 | 0.044 | 2273 | 3 | 90.3 | −0.39 | 5.5 | 22.9 | 31 |
| Example 5 | D-5 | 0.044 | 22727 | 30 | 90.2 | −0.49 | 5.8 | 23.0 | 31 |
| Example 6 | D-6 | 0.044 | 113636 | 150 | 90.2 | −0.43 | 6.3 | 22.6 | 33 |
| Example 7 | D-7 | 0.044 | 227273 | 300 | 90.4 | −0.54 | 6.5 | 22.9 | 33 |
| Example 8 | D-8 | 0.044 | 454545 | 600 | 90.3 | −0.60 | 7.1 | 27.4 | 30 |
| Comp. Ex. 1 | D-9 | 0.044 | 113636 | — | 90.1 | −0.43 | 6.4 | 29.2 | 42 |
| Comp. Ex. 2 | D-10 | 0.044 | 227273 | — | 90.4 | −0.50 | 6.8 | 32.3 | 50 |
| Comp. Ex. 3 | D-11 | 0.044 | 454545 | — | 88.9 | −0.55 | 8.3 | 35.0 | 52 |
| Comp. Ex. 4 | D-12 | 0.044 | 1136364 | — | 85.1 | −0.51 | 12.3 | 39.4 | 83 |
| Comp. Ex. 5 | D-13 | 0.044 | 2272727 | — | 81.3 | −0.57 | 14.5 | 48.4 | 178 |
| Comp. Ex. 6 | D-14 | 0.044 | 1136364 | 1500 | 88.1 | −0.70 | 11.2 | 36.9 | 52 |
| Comp. Ex. 7 | D-15 | 0.044 | 2272727 | 3000 | 84.8 | −0.67 | 13.1 | 43.1 | 168 |
| Example 9 | D-16 | 0.044 | 227 | — | 90.5 | −0.49 | 5.9 | 30.1 | 45 |
| Comp. Ex. 8 | D-17 | 0.044 | 227 | — | 85.5 | −0.63 | 13.2 | 44.2 | 171 |
| Comp. Ex. 9 | D-18 | 0.044 | 113636 | — | 85.3 | −0.65 | 13.4 | 29.2 | 42 |
| Example 10 | D-4' | 0.044 | 2273 | 3 | 90.2 | −0.41 | 5.6 | 23.0 | 30 |
| Example 11 | D-19 | 0.066 | 340.5 | — | 90.0 | −0.51 | 6.1 | 19.9 | 25 |

*1: Concentration to water-absorbent resin in water-absorbent resin composition
*2: Concentration to aluminum cations in water-absorbent resin composition As shown in Table 1, the water-absorbent resin compositions of examples 1 to 3 differ from those of comparative examples 1 to 5 in that the water-absorbent resin compositions of examples 1 to 3 contain Fe cations in an amount of 50,000 ppm or less to the multivalent metal cations other than the Fe cations, thereby containing less of the degraded soluble component and showing a higher degraded liquid permeation rate. The former also exhibit a greater coloring value (L value), indicating that the compositions will color less. These effects are especially evident in examples 1 and 2 because the Fe cations account for 0.1 ppm of the water-absorbent resin in example 1 and 1 ppm in example 2.

The water-absorbent resin compositions of examples 4 to 9, containing a chelating agent, differ from those of comparative example 6, 7. The former contain Fe cations in an amount of 500,000 ppm or less to the multivalent metal cations other than the Fe cations, thereby containing less of the degraded soluble component and showing a higher degraded liquid permeation rate. The former also exhibit a greater coloring value (L value), indicating that the compositions will color less.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The water-absorbent resin composition in accordance with the present invention is, as described in the foregoing, shows only small reduction in liquid permeability and limited coloring over time or in relation to another factor. The composition is therefore suitable for use as an absorbent substance in disposable diapers, as an example.

The invention claimed is:

1. A water-absorbent resin composition comprising:
   a polycarboxylate-based water-absorbent resin as a primary component, the resin having a crosslinked structure formed by polymerization of an acid group-containing unsaturated monomer; and
   aluminum cations,
   wherein:
   the aluminum cations account for 0.001 to 1 mass % of the water-absorbent resin;
   a ratio of Fe cations to the polycarboxylate-based water-absorbent resin is 0.01 to 1 ppm; and
   a ratio of Fe cations to the aluminum cations is 200 to 1,000 ppm.

2. The water-absorbent resin composition of claim 1, further comprising
   a chelating agent.

3. The water-absorbent resin composition of claim 1, wherein:
   the composition is of a particulate shape and contains the aluminum cations on surfaces thereof; and
   the composition is surface crosslinked by a surface crosslinking agent other than the metal cations.

4. The water-absorbent resin composition of claim 1, wherein the composition has a degraded liquid permeation rate of greater than 0 and less than or equal to 40 seconds.

5. The water-absorbent resin composition of claim 1, wherein the composition contains 1 to 28 mass % of a degraded soluble component contained in 100 mass % of the water-absorbent resin composition, wherein the degraded soluble component indicates an amount of the water-absorbent resin composition which has changed over time when dissolved in a physiological saline solution containing 0.005 mass % L-ascorbic acid.

6. The water-absorbent resin composition of claim 1, wherein the composition shows a coloring value (L value) of more than or equal to 90.0.

7. The water-absorbent resin composition of claim 1, wherein:
the composition is of a particulate shape; and
the composition has a mass-average particle diameter of 250 to 600 μm and contains 90 to 100 mass% particles that have a particle diameter of 150 to 850 μm.

8. The water-absorbent resin composition of claim 1, wherein the acid group-containing unsaturated monomer contains 10 to 180 ppm methoxyphenol.

9. A method of manufacturing the water-absorbent resin composition of claim 1 comprising
(a) polymerizing an acid group-containing unsaturated monomer into a polycarboxylate-based water-absorbent resin with a crosslinked structure, the monomer including an acrylic acid and/or a salt thereof as primary components; and
(b) adding aluminum cations in an amount of 0.001 to 1 mass %, based on the water-absorbent resin composition, to the polvcarboxylate-based water-absorbent resin.

10. The method of claim 9, further comprising the step of (c) surface crosslinking the polycarboxylate-based water-absorbent resin by a surface crosslinking agent other than the aluminum cations, step (c) being different from step (b),
wherein step (b) is carried out either in or after step (c).

11. The method of claim 9, further comprising the step of (d) adding a chelating agent to the polycarboxylate-based water-absorbent resin, wherein step (d) is carried out either in or after step (a).

12. The method of claim 9, further comprising the step of (e) adjusting a methoxyphenol content in the acid group-containing unsaturated monomer used in step (a) to 10 to 180 ppm.

13. An absorbent article comprising the water-absorbent resin composition of claim 1.

14. The absorbent article of claim 13, wherein the absorbent article is selected from the group consisting of a paper diaper, a sanitary napkin, and an incontinence pad.

* * * * *